United States Patent
Zhamu et al.

(10) Patent No.: US 9,093,693 B2
(45) Date of Patent: *Jul. 28, 2015

(54) PROCESS FOR PRODUCING NANO GRAPHENE REINFORCED COMPOSITE PARTICLES FOR LITHIUM BATTERY ELECTRODES

(75) Inventors: Aruna Zhamu, Centerville, OH (US);
Bor Z. Jang, Centerville, OH (US);
Jinjun Shi, Columbus, OH (US)

(73) Assignee: SAMSUNG ELECTRONICS CO., LTD. (KR)

( * ) Notice: Subject to any disclaimer, the term of this patent is extended or adjusted under 35 U.S.C. 154(b) by 852 days.

This patent is subject to a terminal disclaimer.

(21) Appl. No.: 12/319,812

(22) Filed: Jan. 13, 2009

(65) Prior Publication Data

US 2010/0176337 A1 Jul. 15, 2010

(51) Int. Cl.
| | |
|---|---|
| *H01M 4/02* | (2006.01) |
| *H01M 4/1391* | (2010.01) |
| *H01M 4/1395* | (2010.01) |
| *H01M 4/38* | (2006.01) |
| *H01M 4/485* | (2010.01) |
| *H01M 4/505* | (2010.01) |
| *H01M 4/525* | (2010.01) |
| *H01M 4/58* | (2010.01) |
| *H01M 4/587* | (2010.01) |
| *H01M 4/62* | (2006.01) |
| *H01M 10/052* | (2010.01) |

(52) U.S. Cl.
CPC .......... *H01M 4/1391* (2013.01); *H01M 4/1395* (2013.01); *H01M 4/38* (2013.01); *H01M 4/485* (2013.01); *H01M 4/505* (2013.01); *H01M 4/525* (2013.01); *H01M 4/587* (2013.01); *H01M 4/5825* (2013.01); *H01M 4/62* (2013.01); *H01M 4/625* (2013.01); *H01M 10/052* (2013.01); *Y02E 60/122* (2013.01); *Y02T 10/7011* (2013.01)

(58) Field of Classification Search
CPC ..... H01M 4/133; H01M 4/134; H01M 4/131; H01M 4/02; H01M 4/38; H01M 4/36; H01M 4/88; C08L 67/00; C08K 3/04; C08K 3/10; C08J 5/04
USPC ......... 429/222, 209, 225, 226, 228, 229, 231, 429/218.1; 977/948, 742; 427/80
See application file for complete search history.

(56) References Cited

U.S. PATENT DOCUMENTS

| | | | |
|---|---|---|---|
| 5,635,151 A | 6/1997 | Zhang et al. | |
| 5,908,715 A | 6/1999 | Liu et al. | |
| 6,316,143 B1 | 11/2001 | Foster et al. | |
| 6,524,744 B1 | 2/2003 | Clerc et al. | |
| 6,733,922 B2 | 5/2004 | Matsubara et al. | |
| 7,037,581 B2 | 5/2006 | Aramata et al. | |
| 7,071,258 B1 | 7/2006 | Jang et al. | |
| 7,094,499 B1 | 8/2006 | Hung | |
| 7,745,047 B2 * | 6/2010 | Zhamu et al. | 429/231.8 |
| 2005/0136330 A1 | 6/2005 | Mao et al. | |
| 2007/0020519 A1 | 1/2007 | Kim et al. | |
| 2007/0122701 A1 | 5/2007 | Yamaguchi | |
| 2010/0173198 A1 * | 7/2010 | Zhamu et al. | 429/222 |

OTHER PUBLICATIONS

U.S. Appl. No. 10/858,814, filed Jun. 3, 2004, B. Jang, et al.
U.S. Appl. No. 11/787,442, filed Apr. 17, 2007, A. Zhamu, et al.
U.S. Appl. No. 11/800,728, filed May 8, 2007, A. Zhamu, et al.
U.S. Appl. No. 11/879,680, filed Jul. 19, 2007, A. Zhamu, et al.
U.S. Appl. No. 11/881,388, filed Jul. 27, 2007, A. Zhamu, et al.
U.S. Appl. No. 11/881,389, filed Jul. 27, 2007, A. Zhamu, et al.
U.S. Appl. No. 11/881,390, filed Jul. 27, 2007, A. Zhamu, et al.
U.S. Appl. No. 11/499,861, filed Aug. 7, 2006, L. Song, et al.
T. Umeno, et al., "Novel Anode Material for Lithium-Ion Batteries: Carbon-coated Silicon Prepared by Thermal Vapor Decomposition," Chemistry Letters, (2001) pp. 1186-1187.
M. Yoshio, et al., "Carbon-Coated Si as a Lithium-Ion Battery Anode Material," J. of the Electrochem. Soc., 149 (12) (2002) A1598-A1603.
N. Dimov, et al., "Characterization of Carbon-Coated Silicon Structural Evolution and Possible Limitations," J. Power Source, 114 (2003) 88-95.
N. Dimov, et al., "Carbon-coated Silicon as Anode Material for Lithium Ion Batteries: Advantages and Limitations," Electrochimica Acta, 48 (2003) 1579-1587.
Z. S. Wen, et al., "High Capacity Silicon/Carbon Composite Anode Materials for Lithium Ion Batteries," Electrochemistry Communications, 5 (2003) 165-168.
C. K. Chan, et al., "High-Performance Lithium Battery Anodes Using Silicon Nanowires," Nature Nanotechnology, 3 (Jan. 2008) 31-35.
T. Zheng, Q. Zhong, and J. R. Dahn, J. Electrochem. Soc. 142 (1995) L211.

(Continued)

*Primary Examiner* — Monique Peets
(74) *Attorney, Agent, or Firm* — Cantor Colburn LLP

(57) ABSTRACT

A process for producing solid nanocomposite particles for lithium metal or lithium ion battery electrode applications is provided. In one preferred embodiment, the process comprises: (A) Preparing an electrode active material in a form of fine particles, rods, wires, fibers, or tubes with a dimension smaller than 1 μm; (B) Preparing separated or isolated nano graphene platelets with a thickness less than 50 nm; (C) Dispersing the nano graphene platelets and the electrode active material in a precursor fluid medium to form a suspension wherein the fluid medium contains a precursor matrix material dispersed or dissolved therein; and (D) Converting the suspension to the solid nanocomposite particles, wherein the precursor matrix material is converted into a protective matrix material reinforced by the nano graphene platelets and the electrode active material is substantially dispersed in the protective matrix material. For a lithium ion battery anode application, the matrix material is preferably amorphous carbon, polymeric carbon, or meso-phase carbon. Such solid nanocomposite particles provide a high anode capacity and good cycling stability. For a cathode application, the resulting lithium metal or lithium ion battery exhibits an exceptionally high cycle life.

21 Claims, 12 Drawing Sheets

(56) References Cited

OTHER PUBLICATIONS

J. S. Xue and J. R. Dahn, J. Electrochem. Soc. 142 (1995) 3668.

F. Disma, L. Aymard, and J.-M. Tarascon, J. Electrochem. Soc., 143 (1996) 3959.

E. Peled, C. Menachem, A. Melman, J. Electrochem. Soc. 143 (1996) L4.

U. Rothlisberger and M. L. Klein, J. Am. Chem. Soc., 117 (1995) 42.

R. Yazami and M. Deschamps, J. Power Sources, 54 (1995) 411.

S. H. Ng, et al., "Highly Reversible Li Storage in Spheroidal C-Coated Silicon Nanocomp. as Anodes for Lithium-Ion Batteries," Angew. Chem. Int. Ed. 45 (2006) 6896-6899.

J. Niu, et al , "Improvement of Usable Capacity and Cyclability of Si-Based Anode Mat. for Li Batteries by Sol-Gel Graphite," Electrochem and Solid-State Lett 5 (2002)A107-110.

T. Morita, et al "Nano Si Cluster-SiOx—C Com. Mat. as High-Capacity Anode Mat. for Rechargeable Li Batteries," J. of the Electrochem Soc., 153 (2006) A425-A430.

J.Yang, et al., "Si/C Composites for High-Capacity Lithium Storage Materials," Electrochemical and Solid-State Letters, 6 (8) (2003) A154-A156.

L.Chen, et al., "Spherical Nanostructured Si/C Composite Prepared by Spray Drying Technique for Lithium Ion Batteries," Materials Science and Eng., B131 (2006) 186-190.

H. Y. Lee, et al "C-Coated Nano-Si Dispersed Oxides/Gr. Comp. as Anode Mat. for Li Ion Batteries," Electrochemistry Communications, 6 (2004) 465-469.

K. W. Kolasinski, Current Opinion in Solid State and Materials Science, 10 (2006) pp. 182-191.

F. D. Wang, et al, "Solution-liquid-solid growth of semiconductor nanowires," Inorg Chem., 45 (2006) pp. 7511-7521.

L. Yuan, et al., "Nano-structured SnO2-Carbon Composites Obtained by in-situ Spray Pyrolysis Method as Anodes in Lithium Batteries," J. Power Source, 146 (2005) 180-184.

C. Lee, et al. "Measurement of the Elastic Properties and Intrinsic Strength of Monolayer Graphene" Science, 321 (Jul. 2008) 385-388.

A. Balandin, et al. "Superior Thermal Conductivity of Single-Layer Graphene," Nano Lett., 8 (3), 902-907, 2008.

A. Geim, "The Rise of Graphene," Nature Materials, vol. 6 (Mar. 2007) 183-191.

* cited by examiner

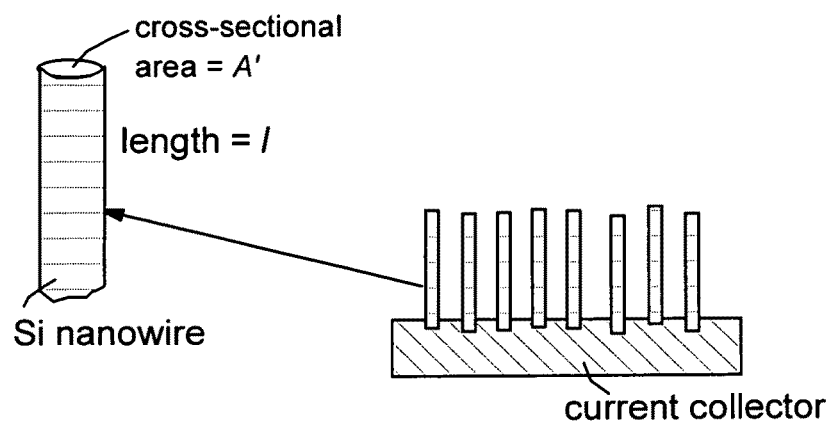
FIG. 3(A) *prior art*
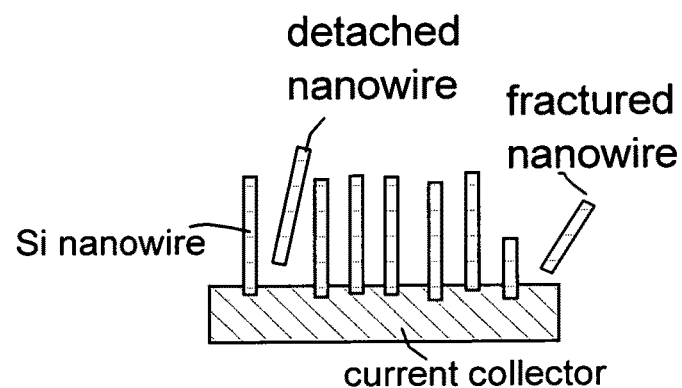
FIG. 3(B) *prior art* (Chan, et al.)

PROCESS FOR PRODUCING NANO GRAPHENE REINFORCED COMPOSITE PARTICLES FOR LITHIUM BATTERY ELECTRODES

FIELD OF THE INVENTION

The present invention provides a process for making a nano graphene reinforced composite particle material for use in a lithium ion battery electrode (anode or cathode) or in a lithium metal cathode.

BACKGROUND

The description of the prior art will be primarily based on the list of references presented at the end of this section. For convenience, the references will be cited with a numerical xx enclosed in a square bracket, [Ref. xx] or simply [xx].

Concerns over the safety of earlier lithium secondary batteries led to the development of lithium ion secondary batteries, in which pure lithium metal sheet or film was replaced by carbonaceous materials as an anode. There are three fundamentally distinct types of carbonaceous anode materials: (a) graphite, (b) amorphous carbon, and (c) graphitized carbon.

The first type of carbonaceous material includes primarily natural graphite and synthetic graphite (or artificial graphite, such as highly oriented pyrolitic graphite, HOPG) that can be intercalated with lithium and the resulting graphite intercalation compound (GIC) may be expressed as $Li_xC_6$, where x is typically less than 1. In order to minimize the loss in energy density due to the replacement of lithium metal with the GIC, x in $Li_xC_6$ must be maximized and the irreversible capacity loss $Q_{ir}$ in the first charge of the battery must be minimized. The maximum amount of lithium that can be reversibly intercalated into the interstices between graphene planes of a perfect graphite crystal is generally believed to occur in a graphite intercalation compound represented by $Li_xC_6$ (x=1), corresponding to a theoretical specific capacity of 372 mAh/g.

Carbon anodes can have a long cycle life due to the presence of a protective surface-electrolyte interface layer (SEI), which results from the reaction between lithium and the electrolyte (or between lithium and the anode surface/edge atoms or functional groups) during the first several charge-discharge cycles. The lithium in this reaction comes from some of the lithium ions originally intended for the charge transfer purpose. As the SEI is formed, the lithium ions become part of the inert SEI layer and become irreversible, i.e. they can no longer be the active element for charge transfer. Therefore, it is desirable to use a minimum amount of lithium for the formation of an effective SEI layer. In addition to SEI formation, $Q_{ir}$ has been attributed to graphite exfoliation caused by electrolyte/solvent co-intercalation and other side reactions [Refs. 1-4].

The second type of anode carbonaceous material is amorphous carbon, which contains no or very little micro- or nano-crystallites. This type includes the so-called "soft carbon" and "hard carbon." The soft carbon is a carbon material that can be readily graphitized at a temperature of 2,500° C. or higher. The hard carbon is a carbon material that cannot be graphitized even at a temperature higher than 2,500° C. In actuality, however, the so-called "amorphous carbons" commonly used as anode active materials are typically not purely amorphous, but contain some small amount of micro- or nano-crystallites. A crystallite is composed of a small number of graphene sheets (basal planes) that are stacked and bonded together by weak van der Waals forces. The number of graphene sheets varies between one and several hundreds, giving rise to a c-directional dimension (thickness Lc) of typically 0.34 nm to 100 nm. The length or width (La) of these crystallites is typically between tens of nanometers to microns.

Among this class of carbon materials, soft and hard carbons made by low-temperature pyrolysis (550-1,000° C.) exhibit a reversible capacity of 400-800 mAh/g in the 0-2.5 V range [Refs. 1-3]. Dahn et al. have prepared the so-called house-of-cards carbonaceous material with enhanced capacities approaching 700 mAh/g [Refs. 1,2]. Tarascon's research group obtained enhanced capacities of up to 700 mAh/g by milling graphite, coke, or carbon fibers [Ref. 3]. Dahn et al. explained the origin of the extra capacity with the assumption that in disordered carbon containing some dispersed graphene sheets (referred to as house-of-cards materials), lithium ions are adsorbed on two sides of a single graphene sheet [Refs. 1,2]. It was also proposed that Li readily bonded to a proton-passivated carbon, resulting in a series of edge-oriented Li—C—H bonds. This provides an additional source of $Li^+$ in some disordered carbons [Ref. 5]. Other researchers suggested the formation of Li metal mono-layers on the outer graphene sheets [Ref. 6] of graphite nano-crystallites. The amorphous carbons of Dahn et al. were prepared by pyrolyzing epoxy resins and may be more correctly referred to as polymeric carbons. Polymeric carbon-based anode materials were also studied by Zhang, et al. [Ref. 7] and Liu, et al. [Ref. 8].

The following mechanisms for the extra capacity over the theoretical value of 372 mAh/g have been proposed [Ref. 4]: (i) lithium can occupy nearest neighbor sites; (ii) insertion of lithium species into nano-scaled cavities; (iii) lithium may be adsorbed on both sides of single layer sheets in very disordered carbons containing large fractions of single graphene sheets (like the structure of a house of cards) [Refs. 1,2]; (iv) correlation of H/C ratio with excess capacity led to a suggestion that lithium may be bound somehow in the vicinity of the hydrogen atoms (possible formation of multi-layers of lithium on the external graphene planes of each crystallite in disordered carbons) [Ref. 6]; and (vi) accommodation of lithium in the zigzag and armchair sites [Ref. 4].

Despite exhibiting a high capacity, an amorphous carbon has a low electrical conductivity (high charge transfer resistance) and, hence, resulting in a high polarization or internal power loss. Conventional amorphous carbon-based anode materials also tend to give rise to a high irreversible capacity due to the existence of too many defect sites that irreversibly trap lithium.

The third type of anode carbonaceous material is graphitized carbon, which includes meso-carbon microbeads (MCMBs) and graphitized carbon fibers (or, simply, graphite fibers). MCMBs are usually obtained from a petroleum heavy oil or pitch, coal tar pitch, or polycyclic aromatic hydrocarbon material. When such a precursor pitch material is carbonized by heat treatment at 400° to 500°, micro-crystals called mesophase micro-spheres are formed in a non-crystalline pitch matrix. These mesophase micro-spheres, after being isolated from the pitch matrix (pitch matrix being soluble in selected solvents), are often referred to as meso-carbon microbeads (MCMBs). The MCMBs may be subjected to a further heat treatment at a temperature in the range of 500° C. and 3,000° C. In order to obtain a stably reversible capacity in an anode, commercially available MCMBs are obtained from heat-treating mesophase carbon spheres at a temperature typically above 2,000° C. and more typically above 2,500° C. for an extended period of time. Graphitized carbons have several drawbacks:

(1) Due to such time-consuming and energy-intensive procedures, MCMBs have been extremely expensive. Likewise, the production of all types of graphite fibers (vapor-grown, rayon-based, pitch based, and polyacrylonitrile-based) is also tedious and energy-intensive and the products are very expensive.

(2) The production of MCMBs having a very small diameter, particularly 5 μm or less has been difficult. When the concentration of optically anisotropic small spheres (meso-phase spheres) increases, the small spheres tend to coalesce and precipitate to produce bulk mesophase and separation of small spheres becomes difficult. This is likely the reason why MCMBs with a bead size less than 5 μm are not commercially available. Smaller anode active material particles are essential to high-rate capacity of a lithium ion battery, particularly for power tool or hybrid vehicle power applications.

(3) Furthermore, both MCMBs and graphite fibers give rise to an anode capacity of typically lower than 350 mAh/g and more typically lower than 320 mAh/g.

In addition to carbon- or graphite-based anode materials, other inorganic materials that have been evaluated for potential anode applications include metal oxides, metal nitrides, metal sulfides, and the like, and a range of metals, metal alloys, and intermetallic compounds that can accommodate lithium atoms/ions or react with lithium. Among these materials, lithium alloys having a composition formula of Li$_a$A (A is a metal such as Al, and "a" satisfies 0<a #5) are of great interest due to their high theoretical capacity, e.g., Li$_4$Si (3,829 mAh/g), Li$_{4.4}$Si (4,200 mAh/g), Li$_{4.4}$Ge (1,623 mAh/g), Li$_{4.4}$Sn (993 mAh/g), Li$_3$Cd (715 mAh/g), Li$_3$Sb (660 mAh/g), Li$_{4.4}$Pb (569 mAh/g), LiZn (410 mAh/g), and Li$_3$Bi (385 mAh/g). However, in the anodes composed of these materials, severe pulverization (fragmentation of the alloy particles) occurs during the charging and discharging cycles due to expansion and contraction of the anode active material induced by the absorption and desorption of the lithium ions. The expansion and contraction, as well as pulverization of active material particles result in loss of contacts between active particles and conductive additives and loss of contacts between the anode active material and its current collector. This degradation phenomenon is illustrated in FIG. 1. These adverse effects result in a significantly shortened charge-discharge cycle life.

To overcome the problems associated with such mechanical degradation, three technical approaches have been followed in the battery industry and scientific research community:

(1) Reducing the size of the active material particle (presumably for the purpose of reducing the strain energy that can be stored in a particle, which is a driving force for crack formation in the particle). However, a reduced particle size implies a higher surface area available for potentially reacting with the liquid electrolyte.

(2) Depositing the electrode active material in a thin film form directly onto a current collector, such as a copper foil. However, such a thin film structure with an extremely small thickness-direction dimension (smaller than 500 nm) implies that only a small amount of active material can be incorporated in an electrode, providing a low total lithium storage capacity (even though the capacity per unit mass can be large).

(3) Using a composite composed of small electrode active particles supported with or protected by a less active or non-active matrix, e.g., carbon-coated Si particles [Refs. 14-18], sol gel graphite-protected Si, metal oxide-coated Si or Sn [Ref. 12], and monomer-coated Sn nano particles [Ref. 13]. Presumably, the protective matrix provides a cushioning effect for particle expansion or shrinkage, as well as prevents the electrolyte from contacting and reacting with the electrode active material. Examples of anode active particles are Si, Sn, and SnO$_2$. However, all of prior art composite electrodes have deficiencies in some ways, e.g., in most cases, less than satisfactory reversible capacity, poor cycling stability, high irreversible capacity, ineffectiveness in reducing the internal stress or strain during the lithium ion insertion and extraction steps, and other undesirable side effects.

For instance, Hung [Ref. 9] disclosed a method of forming a composite anode material. The steps include selecting a carbon material as a constituent part of the composite, chemically treating the selected carbon material to receive nano particles, incorporating nano particles into the chemically treated carbon material, and removing surface nano particles from an outside surface of the carbon material with incorporated nano particles. A material making up the nano particles alloys with lithium. This was a complex process that was not amenable to mass production. Furthermore, the resulting carbon/nanoparticle composite anodes did not exhibit any significant increase in capacity, mostly lower than 400 mAh/g, which is not much better than the specific capacity of graphite.

It may be noted that the coating or matrix materials used to protect active particles (such as Si and Sn) are carbon [Ref. 14-18], sol gel graphite [Ref. 19], metal oxide [Ref. 12], monomer [Ref. 13], ceramic [Ref. 10], and lithium oxide [Ref. 11]. These protective materials are all very brittle and/or weak (of low strength). Ideally, the protective material should meet the following requirements: (a) The coating or matrix material should be of high strength and stiffness so that it can help to refrain the electrode active material particles, when lithiated, from expanding to an excessive extent; (b) The protective material should also have high fracture toughness or high resistance to crack formation to avoid disintegration during repeated charging-discharging cycles; (c) The protective material must be inert (inactive) with respect to the electrolyte, but be a good lithium ion conductor; and (d) The protective material must not provide any significant amount of defect sites that irreversibly trap lithium ions. The prior art protective materials [e.g., Ref. 10-19] all fall short of these requirements. Hence, it was not surprising to observe that, even with high-capacity Si as an anode active material, the resulting anode typically shows a reversible specific capacity much lower than 1,000 mAh/g (based on per gram of the composite material). Furthermore, in most cases, the electrode was not operated beyond 50 cycles, mostly fewer than 40 cycles.

Further attempts to improve the capacity and cycling stability of a lithium ion battery involved the formation of more complex composite structures. For instance, Si particles were first coated with a shell of SiO$_x$ and the resulting core-shell structures were then dispersed in a carbon matrix [Ref. 20,21]. Some improvements have been achieved with this approach, but at the expense of significantly reducing material processing ease. In one case [Ref. 20], the reversible capacity is still low (<800 mAh/g) even though the electrode survives 200 cycles. In another case [Ref. 21] where a slow and expensive CVD process was used to prepare the complex structure, a specific capacity of 1,500 mAh/g was achieved, but only up to 50 cycles.

Complex composite particles of particular interest are (a) a mixture of separate Si and graphite particles dispersed in a carbon matrix prepared by J. Yang, et al. [Ref. 22-24] and by Mao, et al. [Ref. 27], (b) carbon matrix containing complex nano Si (protected by oxide) and graphite particles dispersed therein [Ref. 25], and (c) carbon-coated Si particles distributed on a surface of graphite particles [Ref. 26]. Again, these complex composite particles led to a specific capacity lower than 800 mAh/g (for up to 30-40 cycles only) [Ref. 22-24], lower than 600 mAh/g (up to 40 cycles) [Ref. 25], or lower than 460 mAh/g (up to 100 cycles) [Ref. 26]. These capacity values and cycling stability are not very impressive. It appears that carbon by itself is relatively weak and brittle and the presence of micron-sized graphite particles does not improve the mechanical integrity of carbon since graphite particles are themselves relatively weak. Graphite was used in these cases presumably for the purpose of improving the electrical conductivity of the anode material. Furthermore, polymeric carbon, amorphous carbon, or pre-graphitic carbon may have too many lithium-trapping sites that irreversibly capture lithium during the first few cycles, resulting in excessive irreversibility.

In summary, the prior art has not demonstrated a composite material that has all or most of the properties desired for use as an anode material in a lithium-ion battery. Thus, there is an urgent and continuing need for a new anode for the lithium-ion battery that has a high cycle life, high reversible capacity, low irreversible capacity, small particle sizes (for high-rate capacity), and compatibility with commonly used electrolytes. There is also a need for a method of readily or easily producing such a material in large quantities. It would be further desirable to have a versatile composite approach that is applicable to both anode and cathode materials.

REFERENCES

1. T. Zheng, Q. Zhong, and J. R. Dahn, J. Electrochem. Soc. 142 (1995) L211.
2. J. S. Xue and J. R. Dahn, J. Electrochem. Soc. 142 (1995) 3668.
3. F. Disma, L. Aymard, and J.-M. Tarascon, J. Electrochem. Soc., 143 (1996) 3959.
4. E. Peled, C. Menachem, A. Melman, J. Electrochem. Soc. 143 (1996) L4.
5. U. Rothlisberger and M. L. Klein, J. Am. Chem. Soc., 117 (1995) 42.
6. R. Yazami and M. Deschamps, J. Power Sources, 54 (1995) 411.
7. J. Zhang, et al., "Carbon Electrode Materials for Lithium Battery Cells and Method of Making Same," U.S. Pat. No. 5,635,151 (Jun. 3, 1997).
8. Q. Liu, et al., "Composite Carbon Materials for Lithium Ion Batteries, and Method of Producing Same," U.S. Pat. No. 5,908,715 (Jun. 1, 1999).
9. C. C. Hung, "Carbon Materials Metal/Metal Oxide Nanoparticle Composite and Battery Anode Composed of the Same, U.S. Pat. No. 7,094,499 (Aug. 22, 2006).
10. D. Clerc, et al., "Multiphase Material and Electrodes Made Therefrom," U.S. Pat. No. 6,524,744 (Feb. 25, 2003).
11. D. L. Foster, et al, "Electrode for Rechargeable Lithium-Ion Battery and Method for Fabrication," U.S. Pat. No. 6,316,143 (Nov. 13, 2001).
12. H. Yamaguchi, "Anode Material, Anode and Battery," US 2007/0122701 (Pub. May 31, 2007).
13. H. Kim, et al., "Anode Active Material, Manufacturing Method Thereof, and Lithium Battery Using the Anode Active Material," US 2007/0020519 (Pub. Jan. 25, 2007).
14. T. Umeno, et al., "Novel Anode Material for Lithium-ion Batteries: Carbon-Coated Silicon Prepared by Thermal Vapor Decomposition," Chem. Letters, (2001) 1186-1187.
15. M. Yoshio, et al., "Carbon-coated Si as a Lithium-Ion Battery Anode Material," J. of the Electrochemical Soc., 149 (12) (2002) A1598-A1603.
16. N. Dimov, et al., "Characterization of Carbon-coated Silicon Structural Evolution and Possible Limitations," J. of Power source, 114 (2003) 88-95.
17. N. Dimov, et al., "Carbon-coated Silicon as Anode Material for Lithium Ion Batteries: Advantages and Limitations," Electrochimica Acta, 48 (2003) 1579-1587.
18. S. H. Ng, et al., "Highly Reversible Lithium Storage in Spheroidal Carbon-Coated Silicon Nanocomposites as Anodes for Lithium-Ion Batteries," Angew. Chem. Int. Ed. 45 (2006) 6896-6899.
19. J. Niu and J. Y. Lee, "Improvement of Usable Capacity and Cyclability of Silicon-Based Anode Materials for Lithium Batteries by Sol-Gel Graphite Matrix," Electrochemical and Solid-State Letters, 5(6) (2002) A107-A110.
20. T. Morita and N. Takami, "Nano Si Cluster-$SiO_x$—C Composite Material as High-Capacity Anode Material for Rechargeable Lithium Batteries," J. of the Electrochemical Soc., 153 (2) (2006) A425-A430.
21. M. Amarata, et al., "Conductive Silicon Composite, Preparation Thereof, and Negative Electrode Materials for Non-aqueous Electrolyte Secondary Cell," U.S. Pat. No. 7,037,581 (May 2, 2006).
22. J. Yang, et al., "Si/C Composites for High-Capacity Lithium Storage Materials," Electrochemical and Solid-State Letters, 6 (8) (2003) A154-A156.
23. Z. S. Wen, et al., "High-capacity Silicon/Carbon Composite Anode Materials for Lithium Ion Batteries," Electrochemistry Communications, 5 (2003) 165-168.
24. L. Chen, et al., "Spherical Nanostructured Si/C Composite Prepared by Spray Drying Technique for Lithium Ion Batteries," Materials Science and Eng., B 131 (2006) 186-190.
25. H. Y. Lee and S. M. Lee, "Carbon-Coated Nano-Si Dispersed Oxides/Graphite Composites as Anode Material for Lithium Ion Batteries," Electrochemistry Communications, 6 (2004) 465-469.
26. K. Matsubara, et al., "Carbonaceous Material and Lithium Secondary Batteries Comprising Same," U.S. Pat. No. 6,733,922 (May 11, 2004).
27. Z. Mao, et al. "Carbon-coated Silicon Particle Powder as the Anode Material for Lithium Batteries and the Method of Making the Same," US 2005/0136330 (Jun. 23, 2005).
28. C. K. Chan, et al., "High-Performance Lithium Battery Anodes Using Silicon Nanowires," Nature Nanotechnology, 3 (2008) 31-35.
29. K. W. Kolasinski, "Catalytic growth of nanowires: Vapor-liquid-solid, vapor-solid-solid, solution-liquid-solid and solid-liquid-solid growth," Current Opinion in Solid State and Materials Science, 10 (2006) pp. 182-191.
30. F. D. Wang, A. G. Dong, J. W. Sun, R. Tang, H. Yu and W. E. Buhro, "Solution-liquid-solid growth of semiconductor nanowires," Inorg Chem., 45 (2006) pp. 7511-7521.
31. L. Yuan, et al., "Nano-structured $SnO_2$-Carbon Composites Obtained by in-situ Spray Pyrolysis Method as Anodes in Lithium Batteries," J. Power Source, 146 (2005) 180-184.
32. B. Z. Jang and W. C. Huang, "Nano-scaled Graphene Plates," U.S. Pat. No. 7,071,258 (Jul. 4, 2006).
33. B. Z. Jang, L. X. Yang, S. C. Wong, and Y. J. Bai, "Process for Producing Nano-scaled Graphene Plates," U.S. patent pending, Ser. No. 10/858,814 (Jun. 3, 2004).

34. A. Zhamu, J. Shi, J. Guo, and B. Z. Jang, "Low-Temperature Method of Producing Nano-scaled Graphene Platelets and Their Nanocomposites," U.S. patent Pending, Ser. No. 11/787,442 (Apr. 17, 2007).
35. A. Zhamu, J. Shi, J. Guo and B. Z. Jang, "Method of Producing Exfoliated Graphite, Flexible Graphite, and Nano-Scaled Graphene Plates," U.S. patent Pending, Ser. No. 11/800,728 (May 8, 2007).
36. A. Zhamu, J. Jang, J. Shi, and B. Z. Jang, "Method of Producing Ultra-thin Nano-Scaled Graphene Platelets," U.S. patent Pending, Ser. No. 11/879,680 (Jul. 19, 2007).
37. Aruna Zhamu, Joan Jang, and Bor Z. Jang, "Electrochemical Method of Producing Ultra-thin Nano-Scaled Graphene Platelets," U.S. patent Pending, Ser. No. 11/881,388 (Jul. 27, 2007).
38. Aruna Zham and Bor Z. Jang, "Environmentally Benign Chemical Method of Producing Exfoliated Graphite, Flexible Graphite, and Nano-Scaled Graphene Platelets," U.S. Pat. Pending, Ser. No. 11/881,389 (Jul. 27, 2007).
39. Aruna Zham and Bor Z. Jang, "Environmentally Benign Graphite Intercalation Compound Composition for Exfoliated Graphite, Flexible Graphite, and Nano-Scaled Graphene Platelets," U.S. patent Pending, Ser. No. 11/881,390 (Jul. 27, 2007).
40. Lulu Song, A. Zhamu, Jiusheng Guo, and B. Z. Jang "Nano-scaled Graphene Plate Nanocomposites for Supercapacitor Electrodes" U.S. patent Pending, Ser. No. 11/499,861 (Aug. 7, 2006).
41. C. Lee, X. Wei, J. W. Kysar, & J. Hone, "Measurement of the Elastic Properties and Intrinsic Strength of Monolayer Graphene" Science, 321 (July 2008) 385-388.
42. A. Balandin, S. Ghosh, W. Bao, I. Calizo, D. Teweldebrhan, F. Miao, and C. N. Lau, "Superior Thermal Conductivity of Single-Layer Graphene," *Nano Lett.*, 8 (3), 902-907, 2008.
43. A. Geim, "The Rise of Graphene," *Nature Materials*, Vol. 6 (March 2007) 183-191.

SUMMARY OF THE INVENTION

For the purpose of increasing the strength, stiffness, and fracture toughness of a protective matrix (such as carbon) to maintain the structural integrity of an electrode (either anode or cathode), presumably one can make use of carbon nanotubes (CNTs) as a primary nano reinforcement additive since CNTs are known to have high strength and stiffness. However, at this stage of development, CNTs are extremely expensive and cannot be produced at a high rate in large quantities. The high costs associated with NGPs have been the primary reason responsible their limited uses in industry thus far.

Instead of trying to develop much lower-cost processes for making CNTs, the applicants and co-workers have worked diligently to develop alternative nano-scaled carbon materials that exhibit comparable properties, but are more readily available and at much lower costs. This development work has led to the discovery of processes for producing individual nano graphene sheets (individual basal plane sheets) and stacks of multiple nano graphene sheets, which are collectively called nano graphene platelets (NGPs). The structures of these materials may be best visualized conceptually by making a longitudinal scission on the single-wall or multi-wall of a nano-tube along its tube axis direction and then flattening up the resulting sheet or plate. In practice, NGPs are obtained from a precursor material, such as minute graphite particles, using a low-cost process, but not via flattening of CNTs. It is important to herein point out that NGPs and CNTs are two totally different classes of materials.

One of the cost-effective processes for NGPs is exfoliation of graphite to produce graphite worms of loosely connected flakes, followed by separation of these flakes into isolated (unconnected) nano graphene platelets using mechanical means, such as air jet milling, rotating-blade shearing, and ultrasonication. These nano materials are cost-effective substitutes for CNTs or other types of nano-rods for various scientific and engineering applications. These diligent efforts have led to several patents or patent applications related to NGPs [Refs. 32-40].

For instance, Jang, et al. [Ref. 33] disclosed a process to readily produce NGPs in large quantities. The process includes the following procedures: (1) providing a graphite powder containing fine graphite particles preferably with at least one dimension smaller than 200 µm (most preferably smaller than 1 µm); (2) exfoliating the graphite crystallites in these particles in such a manner that at least two graphene planes are fully separated from each other, and (3) mechanical attrition (e.g., ball milling) of the exfoliated particles to become nano-scaled, resulting in the formation of NGPs with platelet thickness smaller than 100 nm. The starting powder type and size, exfoliation conditions (e.g., intercalation chemical type and concentration, temperature cycles, and the mechanical attrition conditions (e.g., ball milling time and intensity) can be varied to generate, by design, various NGP materials with a wide range of graphene plate thickness, width and length values. We have successfully prepared NGPs with an average length in the range of 0.5 to 10 µm). However, the length or width can be smaller than 500 nm and, in several cases, smaller than 100 nm. Ball milling is known to be an effective process for mass-producing ultra-fine powder particles. The processing ease and the wide property ranges that can be achieved with NGP materials make them promising candidates for many important engineering applications. The electronic, thermal and mechanical properties of NGP materials are comparable to those of carbon nano-tubes; but NGPs are now available at much lower costs and in larger quantities. Again, NGPs are a new, emerging class of nano materials that are distinct and different from CNTs.

It is also important to point out that although NGPs can be derived from natural or artificial graphite, NGPs and graphite are also different and distinct classes of materials. Graphite is a poly-crystalline material characterized by a powder structure, wherein each graphite particle is composed of multiple graphite crystallites typically with each crystallite having both the c-axis dimension, Lc, and the a-axis dimension, La, much greater than 100 nm. These crystallites are randomly oriented with respect to one another and are loosely bonded together with defected grain-boundary zones. By contrast, NGPs can be as thin as a single atomic plane (also referred to as basal plane or graphene plane), which has a thickness of approximately 0.34 nm. This single-layer graphene is a building block for several different types of nano carbon materials (e.g., Fullerene, CNTs and multi-layer NGPs). NGPs can have a thickness up to 100 nm. A multi-layer NGP could be viewed as an ultra-thin single crystal of graphite. The thickness (or number of layers) of an NGP is a fundamentally important parameter. For instance, although a single-layer NGP is a zero-band gap semi-metal, a two-layer graphene is a semiconductor with a finite band gap. Although a single-layer graphene is a ferromagnetic material, a double-layer graphene can be an anti-ferromagnetic material, and a multiple-layer NGPs (greater than 3 or more layers) can be paramagnetic. Hence, the thickness of an NGP is not just a geometric parameter, this parameter is an intrinsic material structural feature. Although graphite is a relatively weak and brittle material, nano graphene has been recently observed to exhibit the highest strength among all materials known to the scientific community [41]. Additionally, nano graphene also exhibits the highest thermal conductivity among existing materials [42]. New and unique properties of graphene are emerging on a daily basis. For a quick overview of this new subject, please refer to [Ref. 43].

After extensive and in-depth research and development efforts, we came to realize that NGPs (particularly those with a thickness <10 nm, preferably <1 nm) are very effective in enhancing the mechanical properties of a protective matrix (such as amorphous carbon or polymeric carbon, polymer, and metal oxide) in a lithium battery electrode. NGP-reinforced protective matrix materials are capable of cushioning the stresses-strains induced to an electro-active particle during lithium insertion and extraction (discharge and charge) cycles. Surprisingly, NGPs were found to significantly enhance the structural integrity (strength and fracture resistance) of a range of protective matrix materials for electrodes, to the extent that a high specific capacity was maintained over a much larger number of cycles compared with those electrodes without an NGP-reinforced protective matrix.

Hence, in one preferred embodiment, as schematically shown in FIGS. 2(A) and 1(B), the present invention provides a process for producing a nano graphene-reinforced nanocomposite solid particle composition containing both NGPs and an electrode active material dispersed in a protective matrix. The electrode active material is in the form of dispersed fine particles (particulates of various shapes, filaments, rods, tubes, and wires, etc.) with a dimension (e.g., diameter) smaller than 1 μm (preferably smaller than 750 nm, further preferably smaller than 500 nm). This nanocomposite solid particle composition is preferably in a form of fine particle (preferably <10 μm, more preferably <5 μm, and most preferably <2 μm) and is most preferably of a spherical or ellipsoidal shape. Such a shape is conducive to the formation of an electrode with a high tap density. A higher tap density means a better packing of electro-active material particles that results in a greater amount of active material per unit volume under an identical coating and laminating condition for electrode fabrication.

In one preferred embodiment, the process for producing solid nanocomposite particles for lithium metal or lithium ion battery electrode applications comprise: (A) Preparing an electrode active material in a form of fine particles, rods, wires, fibers, or tubes with a dimension smaller than 1 μm; (B) Preparing separated or isolated nano graphene platelets with a thickness less than 50 nm; (C) Dispersing the nano graphene platelets and the electrode active material in a precursor fluid medium to form a suspension wherein the fluid medium contains a precursor matrix material dispersed or dissolved therein; and (D) Converting the suspension to the solid nanocomposite particles, wherein the precursor matrix material is converted into a protective matrix material reinforced by the nano graphene platelets and the electrode active material is substantially dispersed in the protective matrix material.

Specifically, the nanocomposite solid particles may be made by (a) preparing-NGPs from a laminar graphite material (such as natural graphite, artificial graphite, MCMB, graphite fiber, and carbon fiber); (b) preparing a precursor (e.g., resin or petroleum pitch) to a protective matrix material, (c) mixing the NGPs and an electro-active material (e.g., Si nano particles, nano-wires, nano-rods, etc) with the precursor (possibly or optionally in a solvent or liquid medium) to form a suspension, (d) transforming the suspension into droplets (e.g., forming micron-sized solid particles using, for instance, an atomization or aerosol formation technique) and removing the solvent; and (e) converting the precursor into the desired protective matrix material (e.g., converting a resin into polymeric carbon via heat treatments). Alternatively, NGPs and electro-active material particles may be mixed with or coated by a monomer (e.g., a triazine-based compound as suggested by Kim, et al [Ref. 13]), a polymer (e.g., sulfonated polyaniline), a ceramic material (e.g., a metal oxide) to form spherical solid particles that require no further chemical conversion. In some cases, additional protective material may be coated onto solid particles, e.g. further coated with an amorphous carbon matrix via chemical vapor deposition.

The matrix material may be selected from a polymer, polymeric carbon, amorphous carbon, meso-phase carbon, coke, petroleum pitch, coal tar pitch, meso-phase pitch, metal oxide, metal hydride, metal nitride, metal carbide, metal sulfide, ceramic, inorganic, organic material, or a combination thereof. Preferably, the protective matrix material comprises a carbon material obtained by pyrolyzing or heat-treating a polymer, monomer, organic material, coal tar pitch, petroleum pitch, meso-phase pitch, sugar, glucose, or a combination thereof. The carbon material is lithium ion-conducting. The amount of this carbon material is preferably reduced by adding a controlled amount of NGPs dispersed therein. The NGPs serve to reduce the sites in amorphous carbon that otherwise could irreversibly trap lithium ions or atoms and significantly enhance the structural integrity of the carbon matrix.

Typically, the obtained nanocomposite solid particles are substantially spherical or ellipsoidal in shape and are of approximately 1-20 μm in size (preferably and usually smaller than 5 μm in diameter or long axis). For the preparation of an electrode (e.g., anode), these nanocomposite solid particles are then bonded together with a binder material (e.g., styrene-butadiene rubber, SBR, poly(tetrafluoroethylene), PTFE, or poly(vinylidene fluoride), PVDF), a procedure similar to the standard procedure in the current practice of making lithium ion batteries. These nanocomposite particles are superior to meso-carbon micro-beads (MCMBs), conventional fine graphite particles, and conventional graphite spherules when used as an anode active material for a lithium ion battery. The presently invented solid nanocomposite particles can be readily mass-produced and are of low cost. Solid particles can be readily made to be smaller than 5 μm if the length/width of NGPs chosen are smaller than 2 or 3 μm in size and the electro-active material particles (in a particulate, wire, rod, tube, or filament form) have a diameter <1 μm. When used as an anode active material, they exhibit a high reversible capacity, a low irreversible capacity, good compatibility with commonly used electrolytes (no graphite layer exfoliation phenomenon and no active material-electrolyte reaction), and a long charge-discharge cycle life.

This is in contrast to the situation as proposed by Chan, et al [Ref. 28], wherein multiple Si nanowires were catalytically grown from a current collector surface in a substantially perpendicular direction, as schematically shown in FIG. 3(A). The electrons produced by the Si nanowires (diameter=89 nm) must travel through the complete nanowire length, a semiconductor with poor conductivity, to reach the current collector. In the nanowire technology of Chan, et al. [28], each Si nanowire is only connected to a current collector through a very narrow contact area (diameter=89 nm) and, hence, the nanowire would tend to detach from the steel current collector after a few volume expansion-contraction cycles. Furthermore, if fragmentation of a nanowire occurs (Si is very brittle), only the segment in direct contact with the steel plate could remain in electronic connection with the current collector and all other segments will become ineffective since the electrons generated will not be utilized, as schematically shown in FIG. 3(B).

In the instant invention, the electro-active nanowires or filaments are protected by a conductive matrix (e.g., carbon), which is preferably further reinforced by NGPs. Even if an electro-active nanowire is fractured into separate segments, individual segments would still remain in physical contact with the conductive matrix or graphene. The electrons generated can still be collected. It is also important to point out that the anode structure of Chan, et al [28] is not compatible with the existing practice of making lithium ion battery that involves coating and laminating anode, separator, and cathode layers through several stages of rolling operations. The vertically grown Si nano-wires would not survive such a procedure. In contrast, our anode material requires no variation in the existing procedures and requires no additional capital equipment.

The NGPs preferably have a thickness less than 100 nm, and a length, width, or diameter less than 10 µm. The thickness is more preferably less than 10 nm and most preferably less than 1 nm. The length, width, or diameter of NGPs is preferably less than 5 µm (more preferably smaller than 2 µm) so that the composite solid particles are typically no greater than 10 µm in diameter (preferably smaller than 5 µm). This will allow for facile migration of lithium ions, enabling a high-rate capacity.

The nano graphene platelets may be obtained from intercalation and exfoliation of a layered or laminar graphite to produce graphite worms composed of exfoliated flakes that are loosely interconnected. The exfoliation is followed by separation of these flakes or platelets. The laminar graphite may be selected from a natural graphite, synthetic graphite, highly oriented pyrolytic graphite, graphite fiber, carbon fiber, carbon nano-fiber, graphitic nano-fiber, spherical graphite or graphite globule, meso-phase micro-bead, meso-phase pitch, graphitic coke, or graphitized polymeric carbon. Natural graphite is particularly desirable due to its abundant availability and low cost. It is desirable that the nano graphene platelets are prepared prior to being incorporated into the protective matrix. We have surprisingly found that graphite crystallites grown in situ from a carbon matrix (after the anode active particle addition step) during a graphitization treatment were not as effective in enhancing the mechanical properties of the carbon matrix as those externally and separately formed NGPs. Furthermore, once the anode active particles (e.g., Si) are incorporated in a carbon matrix, a high temperature treatment (e.g., graphitization for the formation of internal graphene sheets or graphite crystallites) could induce undesirable reactions (e.g. forming SiC, thus reducing the Si amount).

The electrode active material preferably comprises fine particles, rods, wires, fibers, or tubes with a dimension smaller than 0.5 µm, more preferably smaller than 200 nm. Most preferably, the electrode active material comprises nano particles, nano rods, nano wires, nano fibers, or nano tubes with a dimension smaller than 100 nm.

There is no restriction on the type and nature of the anode active material that can be used to practice the present invention. Hence, the anode active material may be selected from the group consisting of:
a) silicon (Si), germanium (Ge), tin (Sn), lead (Pb), antimony (Sb), bismuth (Bi), zinc (Zn), aluminum (Al), and cadmium (Cd);
b) alloys or intermetallic compounds of Si, Ge, Sn, Pb, Sb, Bi, Zn, Al, or Cd with other elements, wherein the alloys or compounds are stoichiometric or non-stoichiometric;
c) oxides, carbides, nitrides, sulfides, phosphides, selenides, and tellurides of Si, Ge, Sn, Pb, Sb, Bi, Zn, Al, Fe, or Cd, and their mixtures or composites; and
d) combinations thereof.

There is also no particular restriction on the type and nature of the cathode active material, which can be selected from, for instance, the group consisting of lithium cobalt oxide, doped lithium cobalt oxide, lithium nickel oxide, doped lithium nickel oxide, lithium manganese oxide, doped lithium manganese oxide, lithium iron phosphate, lithium manganese phosphate, lithium vanadium oxide, doped lithium vanadium oxide, lithium vanadium phosphate, lithium transition metal phosphate, lithium mixed-metal phosphates, metal sulfides, metal phosphides, metal halogenides, and combinations thereof.

Although it is desirable to have a high proportion of electro-active material in the solid nanocomposite structure in order to achieve a high lithium storage capacity, this is limited by a minimum amount of the graphene-reinforced matrix that is needed to cushion the volume expansion-induced stresses and strains (and, hence, strain energy). We have found that, in order to obtain a balance of high specific reversible capacity, low irreversibility, and long cycle life, the following component proportions are most preferred: nano graphene platelets occupy a weight fraction $w_g$ of 2% to 50% of the total nanocomposite weight, the electrode active material occupies a weight fraction $w_a$ of 10% to 80% of the total nanocomposite weight, and the protective matrix material occupies a weight fraction $w_m$ of 4% to 30% of the total nanocomposite weight with $w_g+w_a+w_m=1$.

The present invention also provides a lithium secondary battery comprising an anode, a cathode, a separator disposed between the anode and the cathode, and an electrolyte in contact with the anode and the cathode, wherein the anode and/or cathode comprises the aforementioned composite solid particles as an anode or cathode active material. When the anode contains Si as an anode active material, according to a preferred embodiment of the present invention, one can achieve a reversible specific capacity of greater than 1,000 mAh/g for longer than 500 cycles and, in many cases, even greater than 2,000 mAh/g, calculated on the basis of the total nanocomposite weight.

In one preferred embodiment of the present invention, the process comprises (A) Preparing an electrode active material in a form of nano-rods, nano-wires, nano-fibers, or nano-tubes with a dimension smaller than 0.5 µm; (B) On a separate basis, producing a nano filler material, such as nano graphene platelets (NGPs), and (C) Dispersing the electrode active material and the NGPs in a protective matrix material. Preferably, the electrode active material occupies a weight fraction $w_a$ of 10% to 95% of the total nanocomposite weight, and the solid nanocomposite particle is substantially spherical or ellipsoidal in shape. Preferably, the protective matrix material comprises a nano reinforcement selected from a nano graphene platelet, carbon nano-tube, carbon nano-fiber, or a combination thereof. The protective matrix material preferably comprises polymeric carbon, amorphous carbon, or mesophase carbon.

BRIEF DESCRIPTION OF THE DRAWINGS

FIG. 3 A prior art anode active material in the form of Si nano-wires that were catalytically grown on a surface of a current collector [Ref. 28]: (A) Si nano-wires grown vertically and perpendicularly with respect to a steel substrate; (B) Such a configuration is prone to nano-wire detachment or fragmentation.

DETAILED DESCRIPTION OF PREFERRED EMBODIMENTS

Figure 1:
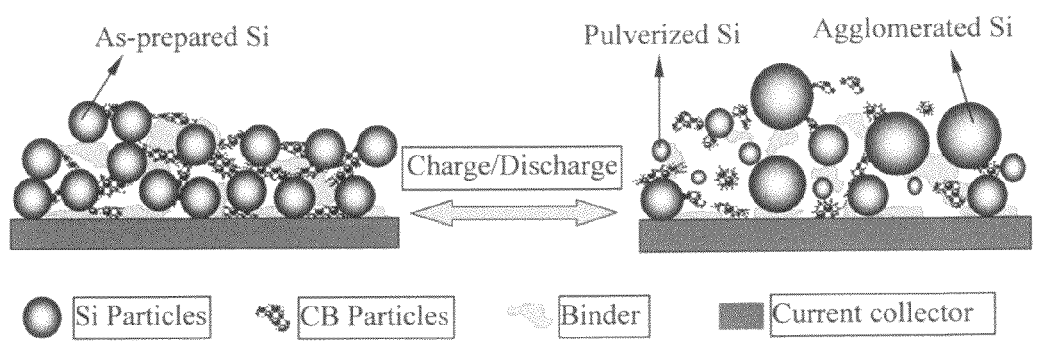
FIG. 1 Schematic of a prior art anode active material (e.g., Si particles) that tends to undergo pulverization during battery cycling.
Figure 2A:
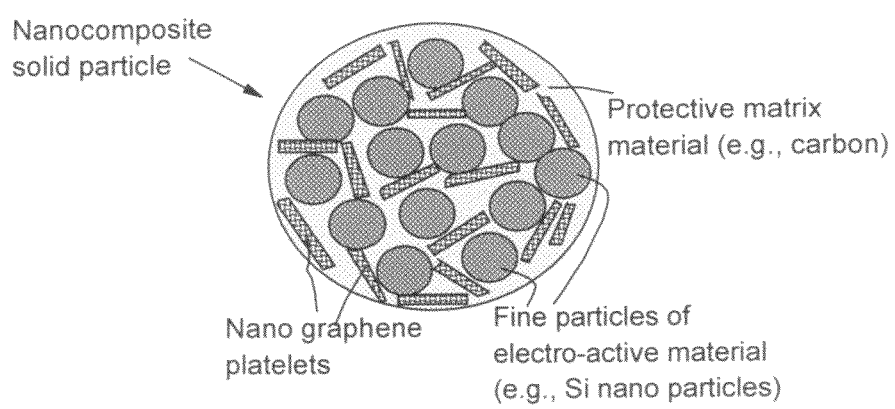
FIG. 2 Two preferred structures of the presently invented solid nanocomposite particles: (A) A spherical nanocomposite particle comprising electro-active materials (e.g., Si nano particles) and NGPs dispersed in a protective matrix (e.g., amorphous carbon); (B) A spherical nanocomposite particle comprising electro-active materials (e.g., Si nano-wires) and NGPs dispersed in a protective matrix (e.g., amorphous carbon)
Figure 2B:
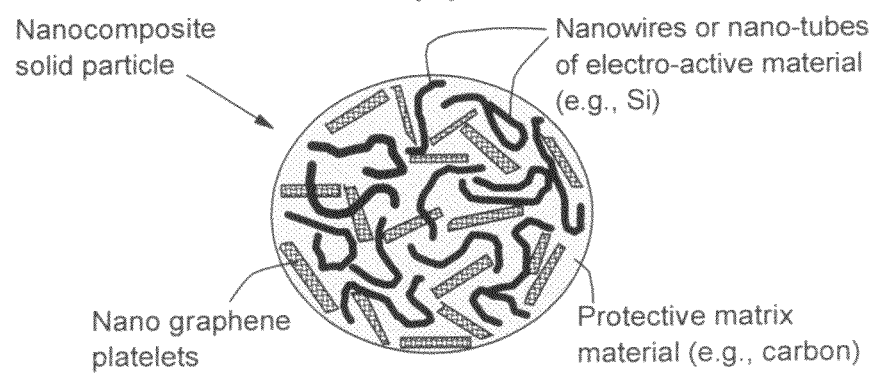

This invention is related to electrode materials for a high-capacity lithium secondary battery, which is preferably a secondary battery based on a non-aqueous electrolyte or a polymer gel electrolyte. The shape of a lithium secondary battery can be cylindrical, square, button-like, etc. The present invention is not limited to any battery shape or configuration.

The present invention provides a process of producing a solid nanocomposite particle composition for lithium metal or lithium ion battery electrode applications. In one preferred embodiment, the composition comprises (A) an electrode active material in a form of fine particles, rods, wires, fibers, or tubes with a dimension smaller than 1 μm (e.g., diameter <1 μm); (B) nano graphene platelets (NGPs); and (C) a protective matrix material reinforced by the NGPs, wherein the NGPs and the electrode active material are prepared separately and are dispersed in the protective matrix material. In this solid nanocomposite composition, the NGPs occupy a weight fraction $w_g$ of 1% to 90% of the total nanocomposite weight, the electrode active material occupies a weight fraction $w_a$ of 1% to 90% of the total nanocomposite weight, and the matrix material occupies a weight fraction $w_m$ of at least 2% of the total nanocomposite weight with $w_g+w_a+w_m=1$. Preferably, the solid nanocomposite particle has a substantially spherical or ellipsoidal shape with a dimension less than 20 μm, preferably less than 10 μm, more preferably less than 5 μm, and most preferably less than 2 μm.

The protective matrix material may be selected from a polymer, a monomer, polymeric carbon, amorphous carbon, meso-phase carbon, coke, petroleum pitch, coal tar pitch, meso-phase pitch, metal oxide, metal hydride, metal nitride, metal carbide, metal sulfide, ceramic, inorganic, organic material, or a combination thereof. This protective matrix material may begin with a precursor material, which is then physically or chemically converted to the matrix material. Preferably, the matrix material comprises a carbon material obtained by pyrolyzing or heat-treating a polymer, organic material, coal tar pitch, petroleum pitch, meso-phase pitch, sugar, glucose, or a combination thereof. The carbon material may also be obtained from chemical vapor deposition (CVD) or chemical vapor infiltration.

The nano graphene platelets (NGPs) preferably have a thickness less than 10 nm and more preferably less than 1 nm. The NGPs may be obtained from exfoliation and platelet separation of a natural graphite, synthetic graphite, highly oriented pyrolytic graphite, graphite fiber, carbon fiber, carbon nano-fiber, graphitic nano-fiber, spherical graphite or graphite globule, meso-phase micro-bead, meso-phase pitch, graphitic coke, or graphitized polymeric carbon according to any of the procedures as disclosed in [Ref. 32-40].

In the solid nanocomposite particle composition, the electrode active material comprises fine particles, rods, wires, fibers, or tubes with a dimension (e.g. diameter) smaller than 1 μm, preferably smaller than 0.5 μm, further preferably smaller than 200 nm, and most preferably smaller than 100 nm. For use in an anode, the electrode active material most preferably comprises nano particles, nano rods, nano wires, nano fibers, or nano tubes of silicon, germanium, or tin with a diameter smaller than 100 nm. With some protective matrix materials (e.g., carbon reinforced with NGPs), sub-micron active particles with a diameter in the range of 100 nm and 1 μm are as effective as those <100 nm in providing a high specific capacity for a long cycle life. However, sub-micron particles can be less expensive than nano particles (diameter <100 nm).

The solid nanocomposite particle of the present invention may be used in an anode or a cathode. For anode applications, the electrode active material comprises an anode active material selected from the group consisting of: (a) silicon (Si), germanium (Ge), tin (Sn), lead (Pb), antimony (Sb), bismuth (Bi), zinc (Zn), aluminum (Al), and cadmium (Cd); (b) alloys or intermetallic compounds of Si, Ge, Sn, Pb, Sb, Bi, Zn, Al, or Cd with other elements, wherein the alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, or Cd, and their mixtures or composites; and (d) combinations thereof. There is essentially no constraint on the type and nature of the anode active material that can be used in practicing the present invention.

A useful class of electro-active materials is in the form of nanoscopic wire, also herein referred to as the nanoscopic-scale wire, nanoscale wire, or nanowire. At any point along its length, a nanowire has at least one cross-sectional dimension and, in some embodiments, two orthogonal cross-sectional dimensions less than about 500 nm, preferably less than about 200 nm, more preferably less than about 100 nm, and most preferably less than about 50 nm. Where nanoscale wires are described as having a core and an outer region, the above dimensions generally relate to those of the core. The cross-section of the nanoscale wire may have any arbitrary shape, including, but not limited to, circular, square, rectangular, tubular, or elliptical, and may have an irregular shape. For example, ZnO nanowires have a hexagonal cross-section, $SnO_2$ nanowires have a rectangular cross-section, PbSe nanowires have a square cross-section, and Si or Ge nanowires have a circular cross-section. Again, the term "diameter" is intended to refer to the average of the major and minor axis of the cross-section. The nanoscale wire may be solid or hollow. The length of the nanoscale wire is preferably at least 1 μm and more preferably at least 5 μm. The wires should have an aspect ratio (length to diameter) of at least about 2:1 and preferably greater than about 10:1.

As used herein, a nanotube (e.g. a carbon nanotube) is generally a nanoscopic wire that is hollow, or that has a hollowed-out core, including those nanotubes known to those of ordinary skill in the art. "Nanotube" is abbreviated herein as "NT." Nanotubes and nano rods may be considered as two special classes of small wires for use in the invention.

Catalytic growth is a powerful tool to form a variety of wire- or whisker-like structures with diameters ranging from just a few nanometers to the micrometer range. A range of phases (gas, solid, liquid, solution, and supercritical fluid) have been used for the feeder phase, i.e. the source of material to be incorporated into the nano-wire. The art of catalytic synthesis of semiconductor or insulator-type nano wires from a wide range of material systems have been reviewed by Kolasinski [Ref. 29] and by Wang, et al. [Ref. 30]. These material systems include Si nanowires (SiNW), heterojunctions between SiNW and CNT, $SiO_x$ (a sub-stoichiometric silicon oxide), $SiO_2$, $Si_{1-x}Ge_x$, Ge, AlN, $\gamma$-$Al_2O_3$, oxide-coated B, $CN_x$, CdO, CdS, CdSe, CdTe, $\alpha$-$Fe_2O_3$ (hematite), $\epsilon$-$Fe_2O_3$ and $Fe_3O_4$ (magnetite), GaAs, GaN, $Ga_2O_3$, GaP, InAs, InN (hexangular structures), InP, $In_2O_3$, $In_2Se_3$, LiF, $SnO_2$, ZnO, ZnS, ZnSe, Mn doped $Zn_2SO_4$, and ZnTe. These nanowires can be used as anode active materials.

Likewise, there is essentially no constraint on the type and nature of the cathode active material provided the active material can be made into a fine particle form (e.g., a spherical particle, nano-wire, nano-fiber, nano-rod, or nano-tube) with a dimension smaller than 1 μm. For cathode applications, the electrode active material may comprise a cathode active material selected from the group consisting of lithium cobalt oxide, doped lithium cobalt oxide, lithium nickel oxide, doped lithium nickel oxide, lithium manganese oxide, doped lithium manganese oxide, lithium iron phosphate, lithium manganese phosphate, lithium vanadium oxide, doped lithium vanadium oxide, lithium vanadium phosphate, lithium transition metal phosphate, lithium mixed-metal phosphates, metal sulfides, metal phosphides, metal halogenides, and combinations thereof.

In order to strike a balance between the proportion of electrode active material (that dictates the lithium storage capacity) and the proportion of NGPs (that provide protection against volume change-induced stresses and strains in a matrix, e.g., carbon matrix), we have conducted an extensive study that covers a wide range of compositions. We have found that the most preferred solid nanocomposite particle composition is such that NGPs occupy a weight fraction $w_g$ of 2% to 50% of the total nanocomposite weight, the electrode active material occupies a weight fraction $w_a$ of 10% to 80% of the total nanocomposite weight, and the matrix material occupies a weight fraction $w_m$ of 4% to 30% of the total nanocomposite weight with $w_g+w_a+w_m=1$.

Thus, in one preferred embodiment, the process for producing solid nanocomposite particles comprise: (A) Preparing an electrode active material in a form of fine particles, rods, wires, fibers, or tubes with a dimension smaller than 1 μm; (B) Preparing separated or isolated nano graphene platelets with a thickness less than 50 nm; (C) Dispersing the nano graphene platelets and the electrode active material in a precursor fluid medium to form a suspension wherein the fluid medium contains a precursor matrix material dispersed or dissolved therein; and (D) Converting the suspension to the solid nanocomposite particles, wherein the precursor matrix material is converted into a protective matrix material reinforced by the nano graphene platelets and the electrode active material is substantially dispersed in the protective matrix material. It may be noted that NGPs used herein are pre-fabricated prior to being mixed with the electro-active material or the matrix material. These NGPs are not formed during step (C) or step (D).

As an example, such a solid nanocomposite particle may be prepared in the following way: Graphene platelets, Si nano particles (a preferred anode active material), and a precursor matrix material (e.g., a monomer, oligomer, prepolymer, resin, polymer, coal tar pitch, petroleum pitch, meso-phase pitch, etc) may be blended together and suspended in a liquid to form a precursor suspension or dispersion. The liquid may be the monomer itself, a solvent for the resin or polymer, or a suspending medium, such as water, with a primary purpose of preparing a dispersion. The suspension may then be aero-solized or atomized to form fine aerosol particles. Concurrently or subsequently, the liquid is removed to form solid particles that are typically spherical in shape (with a diameter typically less than 10 μm) or ellipsoidal in shape (with a major axis less than 10 μm). This procedure may be accomplished by using an aerosol generation, atomization, spray drying, or inkjet printing technique.

It is important to point out that atomization of a mixture of nano or sub-micron-scaled particles, nano graphene platelets, pitch or resin, and a solvent is by no means a trivial task. It is most surprising for us to discover that a mixture or suspension containing more than 10% by weight of NGPs (plus an anode active material, such as Si particles) can still be handled properly with a pump that delivers the suspension to an atomizer head. A suspension containing 5% by weight of carbon nanotubes would have a viscosity too high to be processable. We have been able to atomize a mixture containing 75% by weight NGPs, which is a most impressive result.

As an optional but preferred procedure, the solid particles generated by the atomization or aerosol formation procedure are simultaneously or subsequently subjected to a pyrolyzation (pyrolysis) or carbonization treatment to convert the organic or polymeric material into a carbon material. Essentially, one can use a spray pyrolysis technique, such as ultrasonic spray pyrolysis or electro-spray pyrolysis, to accomplish both the aerosol generation and pyrolysis procedures.

Step (D) of converting the suspension comprises a step selected from (a) solidifying a precursor polymer or resin liquid into a solid polymer or resin (e.g., when step (C) involves mixing NGPs and Si particles in a polymer melt); (b) removing a liquid or solvent from the suspension (e.g., in a case where a solvent is used for dissolving petroleum or coal tar pitch); (c) polymerizing a precursor monomer material; (d) curing a precursor resin to form a solid resin (e.g., curing phenlic resin prior to carbonizing the cured resin); (e) inducing a chemical reaction to form a protective matrix material (e.g., SnO and $Li_3N$ react to form $Li_2O$ and Sn wherein $Li_2O$ is the protective material for Sn particles); (f) heat-treating an organic material to form a carbon matrix material; or a combination thereof. The protective matrix materials may be a monomer (e.g., a triazine-based compound as suggested by Kim, et al [Ref. 13]), a polymer (e.g., sulfonated polyaniline and polyacrylonitile-co-[methylarylate hexylsulfonic acid] that are ion-conducting), or a ceramic material (e.g., a lithium ion-conducting metal oxide such as $Li_2O$).

Hence, the present invention provides a process of making graphene platelet reinforced matrix nanocomposite composition containing an electro-active material dispersed therein in a fine particle form. The active material can contain fine spherical particles, particles of any regular or irregular shape, nano-wires, nano-rods, nano-fibers, or nano-tubes. Preferably, the nanocomposite solid particles are substantially spherical or ellipsoidal in shape to promote better packing during the electrode fabrication procedure (i.e., to increase the tap density). Further preferably, the solid particles comprise therein NGP with a thickness of 0.34 nm-10 nm to enhance the structural integrity of the resulting anode. The length, width, or diameter of NGPs is preferably less than 5 µm (preferably <1 µm) so that the nanocomposite solid particles are typically no greater than 10 µm in diameter (preferably smaller than 2-5 µm). This will allow for facile migration of lithium ions.

The solid nanocomposite particles are now new electro-active materials. The preparation procedures of a positive electrode (cathode) or negative electrode (anode) from active materials are well-known in the art. For instance, the positive electrode can be manufactured by the steps of (a) mixing a positive electrode active material (e.g., the solid nanocomposite particles prepared according to a preferred embodiment of the present invention) with a conductor agent (conductivity-promoting ingredient) and a binder, (b) dispersing the resultant mixture in a suitable solvent, (c) coating the resulting suspension on a current collector, and (d) removing the solvent from the suspension to form a thin plate-like electrode.

The original positive electrode active material, for the preparation of solid nanocomposite particles, may be selected from a wide variety of lithium-containing oxides, such as lithium manganese oxide, lithium-containing nickel oxide, lithium-containing cobalt oxide, lithium-containing nickel cobalt oxide, lithium-containing iron oxide, lithium-containing vanadium oxide, lithium iron phosphate, etc. The positive electrode active material may also be selected from chalcogen compounds, such as titanium disulfate or molybdenum disulfate. More preferred are lithium cobalt oxide (e.g., $Li_xCoO_2$ where $0.8 \leq x \leq 1$), lithium nickel oxide (e.g., $LiNiO_2$) and lithium manganese oxide (e.g., $LiMn_2O_4$ and $LiMnO_2$) because these oxides provide a high cell voltage. Lithium iron phosphate is also preferred due to its safety feature and low cost. All these cathode active substances can be prepared in the form of a fine powder, nano-wire, nano-rod, nano-fiber, or nano-tube. They can be readily mixed with NGPs and dispersed in a protective matrix (e.g., carbon) to form a solid nanocomposite particle.

Acetylene black, carbon black, or ultra-fine graphite particles may be used as a conductor agent. The binder may be chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used. Preferable mixing ratio of these ingredients may be 80 to 95% by weight for the solid nanocomposite particles, 3 to 10% by weight for the conductor agent, and 2 to 10% by weight for the binder. The current collector may be selected from aluminum foil, stainless steel foil, and nickel foil. There is no particularly significant restriction on the type of current collector, provided the material is a good electrical conductor and relatively corrosion resistant. The separator may be selected from a synthetic resin nonwoven fabric, porous polyethylene film, porous polypropylene film, or porous PTFE film.

Carbon materials can assume an essentially amorphous structure (glassy carbon), a highly organized crystal (graphite crystal or crystallite), or a whole range of intermediate structures that are characterized by having various proportions and sizes of graphite crystallites and defects dispersed in an amorphous carbon matrix. Typically, a graphite crystallite is composed of a number of graphene sheets or basal planes (also referred to as a-b planes) that are bonded together through van der Waals forces in the c-axis direction, the direction perpendicular to the basal plane. These graphite crystallites are typically micron- or nanometer-sized in the a- or b-direction (these are called La dimension). The c-directional dimension (or thickness) is commonly referred to as Lc. The interplanar spacing of a perfect graphite is known to be approximately 0.335 nm (3.35 Å). The graphite crystallites are dispersed in or connected by crystal defects or an amorphous phase in a graphite particle, which can be a flake graphite, carbon/graphite fiber segment, carbon/graphite whisker, or carbon/graphite nano-fiber. In the case of a carbon or graphite fiber segment, the graphene plates may be a part of a characteristic "turbostratic" structure.

According to a preferred embodiment of the present invention, an anode comprises nanocomposite solid particles, wherein a solid particle is composed of nano graphene platelets (NGPs) and an anode active material (e.g., nano particles of Si, Ge, or Sn) dispersed in a protective matrix material. The NGPs are pre-fabricated using an inexpensive process [e.g., as explained in Refs. 32-40] from an inexpensive starting material, such as natural graphite. For instance, NGPs can be prepared by the following steps: (a) immersing natural graphite particles in a mixture of sulfuric acid, sodium nitrate, and potassium permanganate at 30° C. to obtain a graphite intercalation compound (GIC); (b) exposing the GIC to a high temperature (e.g. 600-1,100° C.) for a period of 30 seconds to 2 minutes to produce exfoliated graphite; and (c) optionally subjecting the exfoliated graphite to a graphene sheet separation treatment, such as air jet milling, ball milling, rotating-blade shearing, or ultrasonication. In many cases (with adequate intercalation time and sufficient exfoliation temperature), the exfoliated graphite already comprises many fully separated nano graphene platelets and, hence, step (c) is not necessary. It may be noted that these NGPs could comprise a wide spectrum of graphite-based nano sheets or platelets, including from relatively oxygen-free, pristine graphene sheets to highly oxidized graphene sheets that are essentially graphite oxide (GO) nano platelets, depending upon the actual NGP process conditions used.

Selected amounts of NGPs and active material particles (e.g., Si nano-wires or Sn nano particles) are then mixed with a precursor matrix material selected from a monomer, pre-polymer, polymer, aromatic organic (e.g., polycyclic aromatic molecules such as naphthalene, anthracene, and phenanthrene), petroleum-based heavy oil or pitch, coal-based heavy oil or pitch, meso-phase pitch (e.g., obtained by heat-treating coal tar pitch at 400° C. for a desired period of time), or a combination thereof. This precursor matrix can be a liquid at room temperature, or heated to an elevated temperature (typically lower than 300° C.) to become a liquid. Alternatively, a solvent may be used to dissolve this precursor matrix material to form a solution. The liquid or solution state facilitates its mixing with NGPs and anode active material to form a suspension or dispersion.

The resulting suspension can be converted into micron-scaled droplets (nanocomposite solid particles) using several approaches. For instance, the suspension may be aerosolized or atomized to form fine aerosol particles. Concurrently or subsequently, the liquid or solvent is removed to form solid particles that are typically spherical or ellipsoidal in shape with a diameter or major axis less than 10 μm and, in most cases, less than 5 μm if the NGP lateral dimensions are mostly less than 2 μm. This procedure may be executed by using an aerosol generation, atomization, spray drying, or inkjet printing apparatus, which apparatus are well-known in the art. As an optional but preferred procedure, the solid particles are simultaneously or subsequently subjected to a pyrolysis or carbonization treatment to convert the organic or polymeric material into a carbon material. The heat treatment of petroleum or coal-based heavy oil or pitch will serve to convert at least part of the oil or pitch into a meso-phase, an optically anisotropic or liquid crystalline phase of a fused aromatic ring structure. The converted pitch is called a meso-phase pitch. Since NGPs are essentially pure graphite-based or graphene materials, this low temperature heat treatment (350-1,200° C.) has no adverse effect on the NGP structure. Essentially, one can use a spray pyrolysis technique, such as ultrasonic spray pyrolysis or electro-spray pyrolysis, to accomplish both the aerosol generation and pyrolysis procedures.

The NGP/active material-precursor suspension may also be converted into nanocomposite solid particles using combined extrusion, pelletization (granulation), and grinding (including ball milling). Surprisingly, a large proportion of NGPs and active material can be incorporated into a matrix to form a nanocomposite mixture that is highly flowable (fluid-like) even with an NGP loading as high as 75% by weight in most of the aforementioned precursor matrix materials. This is likely due to their two-dimensional, platelet shape, enabling NGPs to readily slide over one another in a liquid medium. Hence, an NGP-containing suspension can be extruded into filaments, which are cut into small granules that are millimeter in size. These granules are then further reduced in size using grinding or ball milling. The resulting micron-scale particles are not necessarily spherical in shape, but still can be easily bonded by a binder material.

The binder material may also be selected from a polymer, polymeric carbon, amorphous carbon, coal tar pitch or heavy oil, petroleum pitch or heavy oil, meso-phase pitch, metal, glass, ceramic, oxide, organic material, or a combination thereof. In one preferred embodiment, the binder may be chosen from polytetrafluoroethylene (PTFE), polyvinylidene fluoride (PVDF), ethylene-propylene-diene copolymer (EPDM), or styrene-butadiene rubber (SBR), for example, as in the cases of conventional MCMB- or graphite-based anodes. Preferably, the binder material may be a conducting polymer, such as polyacetylene, polypyrrole, polyaniline, polythiophene, and their derivatives.

It may be noted that this new class of nanocomposite solid particles is fundamentally different from MCMBs although the latter contain graphene crystallites as well (these graphene crystallites were nucleated and grown in situ directly from the meso-phase matrix during graphitization). In contrast, our nano graphene sheets or platelets were made separately and independently from the carbon formation process and then added to the carbon matrix along with an electro-active material. MCMBs are typically produced by (a) heating and carbonizing selected heavy oil or pitch to form meso-phase micro-spheres dispersed in an isotropic matrix pitch; (b) separating the meso-phase micro-spheres from the isotropic pitch; and (c) graphitizing the isolated meso-phase micro-spheres (this latter step being tedious and energy-intensive). The NGPs in the presently invented nanocomposite solid particles are not obtained by graphitizing the precursor matrix material, as opposed to the case of conventional MCMB productions. The present solid nanocomposite particle composition contains a high-capacity electro-active material and, hence, exhibits exceptionally high reversible anode capacity, much higher than that of state-of-the-art MCMBs. Furthermore, NGPs used in the present invention can come from natural graphite that is already highly graphitized. One only needs to disperse NGPs in a carbonaceous matrix, along with an electro-active material. No graphitization at a high temperature (>2,500° C.) is required. The presently invented nanocomposite solid particles and their anode structures can be very inexpensive.

A wide range of electrolytes can be used for practicing the instant invention. Most preferred are non-aqueous and polymer gel electrolytes although other types can be used. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery. The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 2.0 mol/l.

The following examples serve to illustrate the best mode practice of the present invention and should not be construed as limiting the scope of the invention, which is defined in the claims.

EXAMPLE 1

Preparation of NGPs of Various Sizes from Natural Graphite and Production of Corresponding NGP-Reinforced Solid Nanocomposite Particles Natural flake graphite, nominally sized at 45 μm, provided by Asbury Carbons (405 Old Main St., Asbury, N.J. 08802, USA) was milled to reduce the size to approximately 14 μm. The chemicals used in the present study, including fuming nitric acid (>90%), sulfuric acid (95-98%), potassium chlorate (98%), and hydrochloric acid (37%), were purchased from Sigma-Aldrich and used as received. Graphite intercalation compounds (GICs), which were actually highly oxidized graphite or graphite oxide (GO) samples, were prepared according to the following procedure:

In a typical procedure, a reaction flask containing a magnetic stirring bar was charged with sulfuric acid (1.76 L) and nitric acid (0.90 L) and cooled by immersion in an ice bath. The acid mixture was stirred and allowed to cool for 20 min, and graphite (100 g) was added under vigorous stirring to avoid agglomeration. After the graphite powder was well dispersed, potassium chlorate (800 g) was added slowly over 25 min to avoid sudden increases in temperature. The reaction flask was loosely capped to allow evolution of gas from the reaction mixture, which was stirred for 72 hours at room temperature. On completion of the reaction, the mixture was poured into 40 L of deionized water and filtered. The GO was re-dispersed and washed in a 5% solution of HCl to remove sulphate ions. The filtrate was tested intermittently with barium chloride to determine if sulphate ions are present. The HCl washing step was repeated until the test result was negative. The GO was then washed repeatedly with deionized water until the pH of the filtrate was neutral. The GO slurry was spray-dried and stored in a vacuum oven at 60° C. until use.

Approximately 50 grams of the dried GICs or GO materials were exposed to a thermal shock at 900° C. for 45 seconds in a quartz tube filled with nitrogen gas to obtain an exfoliated graphite sample. Several batches of this exfoliated graphite, each of approximately 5 grams, were dispersed in water to form suspensions, which were ultrasonicated at a power level of 75 watts for several different periods of times: 2 minutes, 10 minutes, 30 minutes, 2 hours, and 24 hours. The resulting NGPs were separately spray-dried with their average dimensions measured by using a combination of scanning electron microscopy (SEM), transmission electron microscopy (TEM), atomic force microscopy (AFM), and specific surface area measurements using a BET apparatus.

This series of dried NGP powder samples were then separately mixed with controlled amounts of petroleum pitch (A240 from Ashland Oil), toluene (as a solvent or diluent for pitch), and silicon particles (with an average diameter of 60 nm) to form a range of separate nanocomposite suspensions. These suspensions were fed into a laboratory scale spray drier equipped with an atomizer head. This procedure produced relatively spherical solid nanocomposite particles that are typically micron-scaled with a relatively narrow particle size distribution. Each solid particle was composed of three components: Si nano particles, NGPs, and pitch wherein both Si particles and NGPs were well-dispersed in the pitch matrix. Each of the pitch matrix nanocomposites was heat-treated at 750° C. for two hours to obtain a carbon matrix nanocomposite. In such a multi-phase structure, the otherwise relatively weak pitch carbon matrix was reinforced by high-strength NGPs and Si serves as an anode active material providing a high specific capacity. NGPs by themselves are also a good anode active material imparting additional charge storage capacity. The carbon matrix provides protection against the potential chemical reaction between Si nano particles and the electrolyte and the interaction between NGPs and the electrolyte. Furthermore, NGPs serve to reduce the proportion of carbon matrix that otherwise would tend to trap a significant amount of lithium, possibly resulting in a high level of irreversibility.

Figure 4:
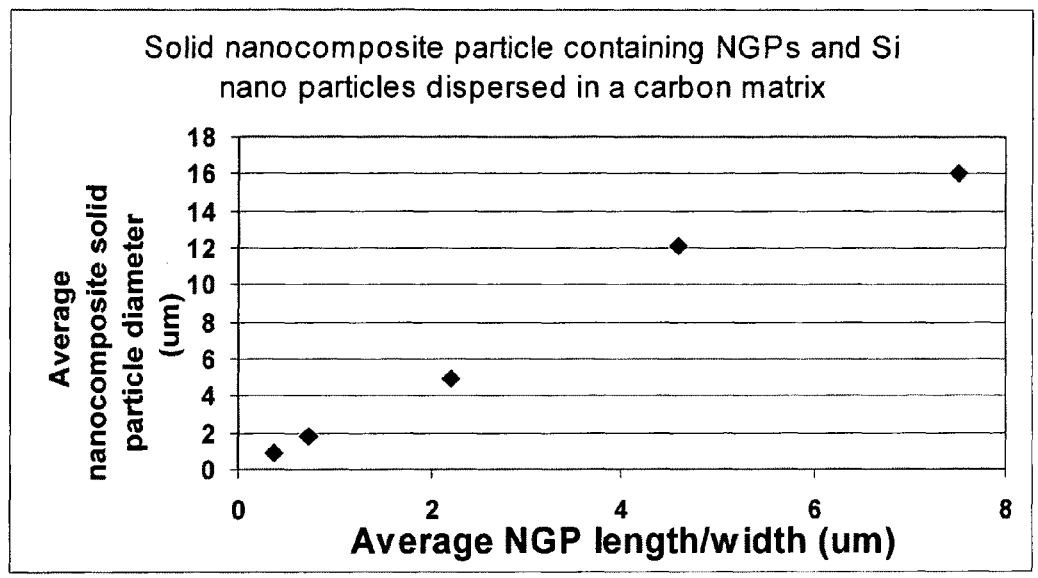
FIG. 4 The lateral dimensions (average length and width) of NGPs appear to dictate the diameters of the NGP-containing nanocomposite solid particles after atomization or spray-drying.

The average solid nanocomposite particle size from each suspension was measured and the data was plotted as a function of the corresponding NGP lateral dimension (length or width) in FIG. 4. All samples indicated in FIG. 4 have an NGP proportion of 30% by weight, Si nano particle proportion of 30% and carbon matrix of 40%. This diagram indicates that the nanocomposite solid particle diameter scales with the constituent NGP length/width since Si particles are so small (60 nm) and that we could readily produce nanocomposite solid particles smaller than 5 μm in diameter. Much to our surprise, particles less than 1 μm in diameter were also readily achievable. This is in sharp contrast to the commercially available MCMBs that have been limited to particle sizes greater than 5 μm in diameter. Smaller anode active material particles are particularly amenable to fast battery charge and discharge operations, leading to high-rate capacity batteries.

EXAMPLE 2

Cycling Behaviors of NGP-Containing Nanocomposite, NGP-Free Nanocomposite, and Graphite-Filled Nanocomposite Solid Particle-Based Anodes (all Containing Si Nano Particles)

In Example 1, a series of samples containing different weight fractions of Si nano particles (2% to 90%) and different weight fractions of NGPs (2% to 90%) in a carbon matrix (5% to 60%) were prepared.

Figure 5:
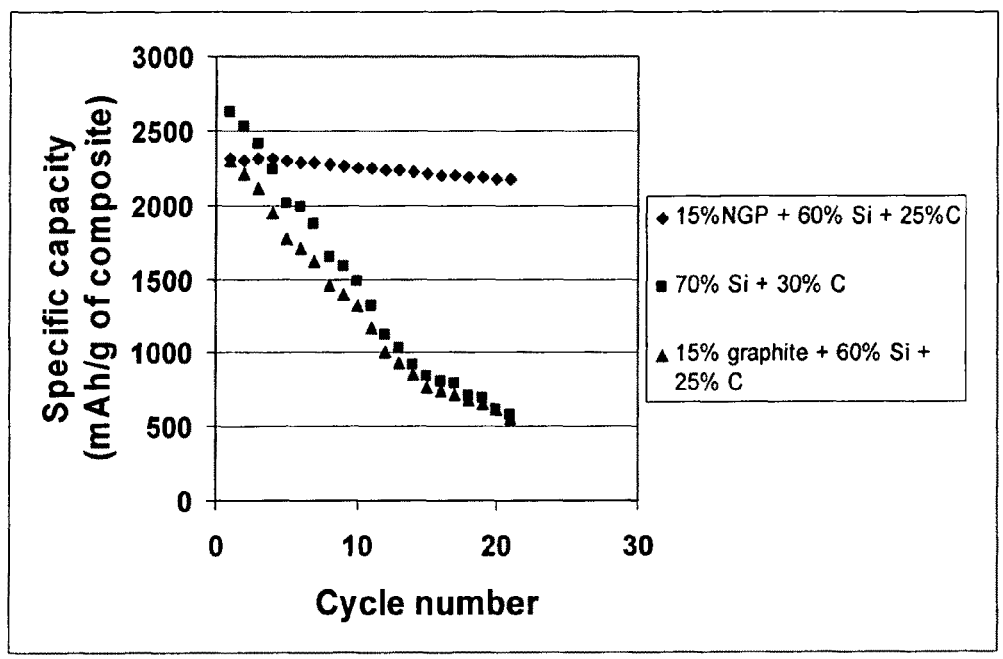
FIG. 5 The half-cell cycling behaviors of Sample 1 (NGP-reinforced carbon matrix-protected Si nano particles), Comparative Sample 1a (carbon-protected Si nano particles, no NGPs), and Comparative Sample 1b (carbon-protected, with conventional graphite particle; no NGP).
Figure 6:
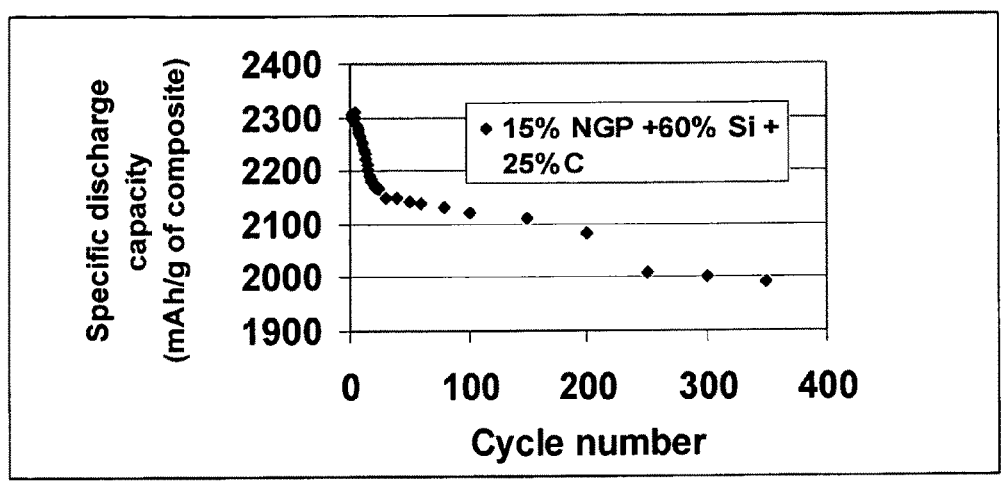
FIG. 6 Long cycle life of Sample 1.

One of the samples prepared contains approximately 15% NGPs, 60% Si nano particles, and 25% carbon matrix and is herein designated as Sample 1. For comparison purpose, a Comparative Sample 1a was prepared by dispersing Si nano particles (approximately 70%) in a pitch matrix, as in Sample 1 but without the presence of the NGP. A Comparative Sample 1b was prepared by replacing NGPs with fine natural graphite particles (average diameter=3.5 μm) obtained by air-jet milling of natural flake graphite. FIG. 5 shows the half-cell cycling behaviors of Sample 1, Comparative Sample 1a, and Comparative Sample 1b. It is clear that the sample containing NGPs as a nano reinforcement is far superior to the sample containing no NGPs and the sample containing conventional graphite particles instead of NGPs. This is a highly surprising results in view of the results of the prior art studies on anode materials based on Si and graphite particles dispersed in a carbon matrix [Refs. 22-27]. The composite particles disclosed in the prior art led to a specific capacity lower than 800 mAh/g (for up to 30-40 cycles only) [Ref. 22-24], lower than 600 mAh/g (up to 40 cycles) [Ref. 25], or lower than 460 mAh/g (up to 100 cycles) [Ref. 26]. These capacity values and cycling stability are not nearly as good as what we have achieved (e.g., FIG. 6). It appears that carbon by itself is relatively weak and brittle and the presence of micron-sized graphite particles does not improve the mechanical integrity of carbon since graphite particles are themselves relatively weak. By contrast, the anode materials herein developed have shown a reversible capacity of >2,000 mAh/g (per gram of total composite weight counting Si, NGP, and C matrix weights) for over 350 cycles. Clearly, NGPs are capable of helping to maintain structural integrity of a protective matrix, such as carbon, for an anode active material.

As indicated earlier, carbon-coated Si has been investigated as a potential lithium ion battery material, for instance, by T. Umeno, et al. [Ref. 14,15]. They have shown "the excellent electrochemical performance of carbon-coated Si as anode materials for lithium-ion batteries in terms of high reversible capacity over 800 mAh/g, high coulombic efficiency, good cyclability, satisfactory compatibility with both the EC and PC-based electrolytes, and better thermal stability than that of graphite, etc." They believed that "carbon-coating in the outer layer played a very important role in the improvement of the electrochemical behavior by not only suppressing the decomposition of electrolytes on the surface of Si-based electrodes, but also providing integral and continuous electric contact networks around Si particles even they are a little expanded after lithium insertion." However, these researchers have indicated that "If the lithiation capacity of carbon-coated Si is controlled under 1,200 mAh/g(Si), satisfactory cycleability can be obtained" [Ref. 14]. By contrast, we have effectively increased the lithiation capacity to approximately 3,800 mAh/g (per gram of Si, corresponding to an alloy of $Li_{3.8}Si$) and yet still maintained an outstanding cycling stability when the carbon matrix is reinforced with NGPs.

EXAMPLE 3

NGP Reinforced Nanocomposite Solid Particles (NGPs Prepared from Other Laminar Graphite Materials)

NGPs of Samples 3A, 3B, 3C, and 3D were prepared according to the same procedure used for Sample 1, but the starting graphite materials were highly oriented pyrolytic graphite (HOPG), graphite fiber (Amoco P-100), graphitic carbon nano-fiber (from Applied Sciences, Inc., Cedarville, Ohio), and spheroidal graphite (from Hua Dong Graphite Co., Pingdu, China), respectively. Their final interplanar spacings, according to x-ray diffraction data, prior to exfoliation and separation, were 6.6 Å, 7.3 Å, 7.3 Å, and 6.6 Å, respectively. They were exposed to an exfoliation temperature of 950° C. for 45 seconds, followed by a mechanical shearing treatment using a Cowles rotating-blade apparatus for 30 minutes. The resulting suspensions or slurries were then subjected to a drying treatment to obtain NGPs.

The NGPs, along with various proportions of nano Si particles and SnO particles, were separately mixed with a phenolic resin to form several mixtures. These mixtures were independently extruded into small diameter filaments (1-2 mm diameter) using a simple plunger-type device, cured at 200° C. for 2 hours, carbonized at 700° C. for 1 hour, chopped into small particles, and then ball-milled for 24 hours. The resulting milled particles are generally irregular in shape with a dimension typically smaller than 3 μm. These solid nanocomposite particles are each composed of an electro-active material (Si or SnO), NGPs, and a carbon matrix.

EXAMPLE 4

NGP Reinforced Metal Oxide Nanocomposite Solid Particles

The electro-active particles in Example 4 include materials derived from metal oxides of the type MO or $MO_2$, where M=Sn, Pb, Ge, Si, or Cd. As an example, the active materials may be prepared according to the following steps: (1) stanous oxide (SnO) powder and lithium nitride ($Li_3N$) powder were mixed in a stoichiometric ratio of two moles of $Li_3N$ to three moles of SnO; (2) the mixture of powders from step (1), along with a selected amount of NGPs (from Sample 3D), were fed into a planetary ball mill (Model PM-400 from Glen Mills, Clifton, N.J.), and the milling was proceeded until the reaction between SnO and $Li_3N$ reached a state characterized by complete disappearance of the X-ray diffraction patterns for crystalline SnO and $Li_3N$, and the subsequent appearance of the X-ray patterns for amorphous $Li_2O$ and crystalline Sn. The ball milling process typically lasts for one to two days at ambient temperature. The resulting product was a powder mixture containing crystalline Sn particles dispersed in an amorphous $Li_2O$ matrix, which was reinforced by NGPs. The particles are composed of approximately 86% by weight of the $Li_2O$—Sn mixture and 14% by weight of NGPs. The solid nanocomposite particles were then bonded with 7% resin binder (Sample 4). A Comparative Sample 4a was prepared from the $Li_2O$—Sn mixture powder (without any NGP) bonded with approximately 7% resin binder, along with 8% carbon black powder as a conductive additive.

Figure 7:
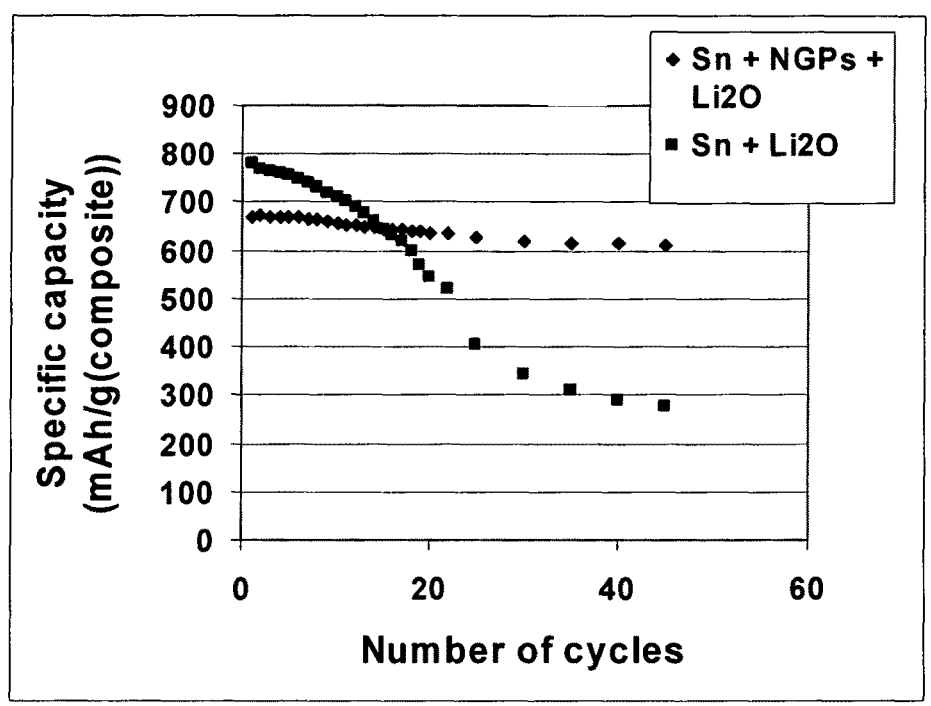
FIG. 7 Cycling behaviors of Sn particles dispersed in NGP-reinforced and un-reinforced $Li_2O$ matrix.

The specific capacity data for Sample 4 and Comparative Sample 4a, summarized in FIG. 7, clearly show that the NGP-reinforced matrix $Li_2O$ for Sn particles provides a better cycling stability than the corresponding $Li_2O$-protected Sn material system. Although the initial reversible specific capacity, calculated based on the total nanocomposite weight, was lower (since NGP weight was counted), the NGP-reinforced $Li_2O$ matrix appears to provide a reliable protection against volume change-induced stresses/strains in the Sn particles and cracking of the matrix. In the case of a protective matrix without NGP reinforcement, the specific capacity rapidly degraded as charge-discharge cycles were repeated.

EXAMPLE 5

Nanocomposites Containing $Si_xSn_qM_yC_z$ Type Electro-active Materials

The electro-active particles in this example are $Si_xSn_qM_yC_z$ type compositions with $(q+x)>(2y+z)$, $x>0$, and M is one or more metals selected from manganese, molybdenum, niobium, tungsten, tantalum, iron, copper, titanium, vanadium, chromium, nickel, cobalt, zirconium, yttrium, or combinations thereof, wherein the Si, Sn, M, and C elements are arranged in the form of a multi-phase microstructure comprising at least one amorphous or nanocrystalline phase. As an example, Sample 5a was prepared by ball-milling silicon chips, cobalt powder, and graphite powder with 28 tungsten carbide balls (5/16-inches each, approximately 108 grams) for 4 hours in a 45 milliliter tungsten carbide vessel using a planetary ball mill (Model PM-400 from Glen Mills, Clifton, N.J.) under an argon atmosphere. The vessel was then opened, chunks of caked powder were broken up, and the milling was continued for an additional hour in an argon atmosphere. The temperature of the tungsten carbide vessel was maintained at about 30° C. by air cooling. The product was determined to be approximately $Si_{73}Co_{23}C_4$. The product in fine powder form was then mixed with a selected proportion of NGPs, phenolic resin, and acetone to make a suspension, which was then subjected to spray pyrolysis to obtain nanocomposite particles. The particles, containing phenolic resin, was then cured at 200° C. for one hour and carbonized at 600° C. for two hours to obtain the desired solid nanocomposite particles as an anode active material.

EXAMPLE 6

Si Nanowire-Based Nanocomposite Particles

In a typical procedure, approximately 2.112 g of silicon powders (average diameter 2.64 μm) were mixed with 80 ml of a 0.1M aqueous solution of $Ni(NO_3).6H_2O$ and vigorously stirred for 30 min. Then, water was evaporated in a rotary evaporator and the solid remnants were completely dried in an oven at 150° C. The final sample (Ni-impregnated Si powers) was obtained by grinding the solids in a mortar.

Subsequently, 0.03 g of Ni-impregnated Si particles were put in a quartz boat, and the boat was placed in a thermal furnace. The sample was reduced at 500° C. for 4 hours under flowing Ar (180 sccm) and $H_2$ (20 sccm), then the temperature was raised to 990° C. to synthesize Si nanowires.

For the purpose of separating Si nanowires, for instance, every 0.1 g of the reacted Si powders were mixed with 10 ml of ethanol and the resulting mixture was sonicated for 1 hour. Subsequently, Si nanowires were separated from the Si powders by centrifuge at 5000 rpm for 10 min.

Si nanowires were then mixed with controlled amounts of petroleum pitch, toluene, and NGPs to form nanocomposite suspensions. These suspensions were fed into a laboratory scale spray drier equipped with an atomizer head. This procedure produced relatively spherical solid nanocomposite particles that are typically micron-scaled with a relatively narrow particle size distribution. Each solid particle was composed of three components: Si nanowires, NGPs, and pitch wherein both Si nanowires and NGPs were well-dispersed in the pitch matrix. The pitch matrix nanocomposites were heat-treated at 750° C. for two hours to obtain a carbon matrix nanocomposite with a final composition of approximately 45% Si nanowires, 22% NGPs, and 33% carbon matrix (Sample 6A). A Comparative Sample 6B was prepared that was composed of approximately 46% Si nanowires, 21% carbon nano-tubes (CNTs), and 33% carbon matrix. Another sample, Comparative Sample 6C, was prepared that was composed of approximately 45% Si nanowires and 55% carbon matrix.

Figure 8:
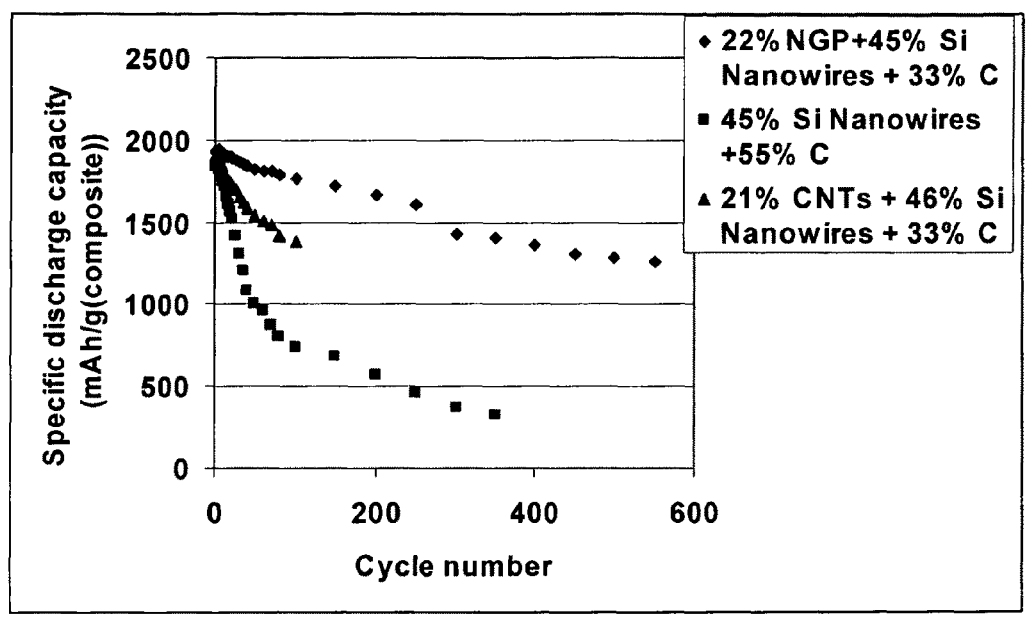
FIG. 8 Cycling behaviors of Sample 6A (45% Si nanowires, 22% NGPs, and 33% carbon matrix, Comparative Sample 6B (approximately 46% Si nanowires, 21% carbon nano-tubes, and 33% carbon matrix) and Comparative Sample 6C (45% Si nanowires and 55% carbon matrix).

The cycling responses of these three samples were studied using a half cell testing configuration in which a Li foil serves as both a reference and counter electrode and the prepared nanocomposite solid particle-based electrode as a working electrode. The results are summarized in FIG. 8. It is clear that the anode materials protected by NGP-reinforced carbon matrix led to a superior cyclic response in terms of high specific capacity and cycling stability (still >1,250 mAh/g, per gram of total composite weight, after an impressive 550 cycles). This is even better than those of the materials protected by carbon nano-tubes (CNTs), which are much more expensive. However, CNT-reinforced carbon-protected electrodes do provide relatively good cycling responses, up to 100 cycles (the limit of my patience during that experiment). By contrast, the carbon matrix, without a nano filler, provides a limited protection.

EXAMPLE 7

Lithium Iron Phosphate-Containing Nanocomposite Particles for the Cathode

Lithium iron phosphate $LiFePO_4$ is a promising candidate cathode material in lithium-ion batteries for electric vehicle applications. The advantages of $LiFePO_4$ as a cathode active material includes a high theoretical capacity (170 mAh/g), environmental benignity, low resource cost, good cycling stability, high temperature capability, and prospect for a safer cell compared with $LiCoO_2$. The major drawback with this material has been low electronic conductivity, on the order of $10^{-9}$ S/cm$^2$. This renders it difficult to prepare cathodes capable of operating at high rates. In addition, poor solid-phase transport means that the utilization of the active material is a strong function of the particle size. The presently invented nanocomposite approach overcomes this major problem by using nano-scaled particles (to reduce the Li ion diffusion path and electron transport path distance) dispersed in a carbon matrix reinforced with NGPs.

Figure 9:
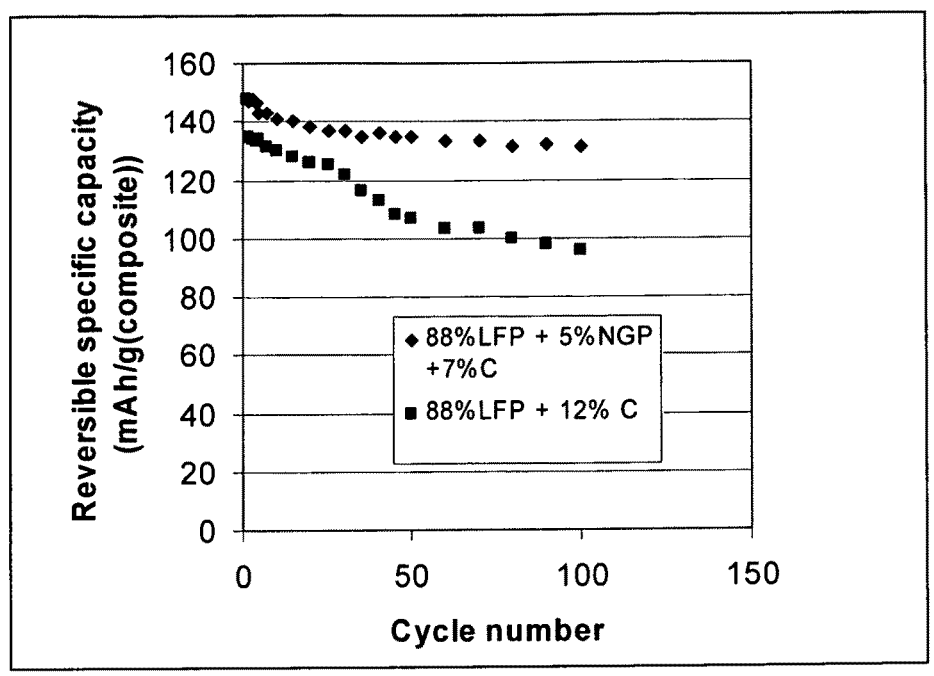
FIG. 9 Cycling responses of two lithium ion phosphate-based nanocomposite electrodes.

Lithium iron phosphate ($LiFePO_4$) particles were mixed with a selected proportion of NGPs, phenolic resin, and acetone to make a suspension, which was then subjected to spray pyrolysis to obtain nanocomposite particles. The particles, containing phenolic resin, was then cured at 200° C. for one hour and carbonized at 600° C. for two hours to obtain the desired solid nanocomposite particles as a cathode active material. The final composition contains approximately 88% by weight lithium ion phosphate nano particles, 5% by weight NGPs, and 7% by weight carbon. A comparative sample containing approximately 88% by weight lithium ion phosphate nano particles and 12% carbon matrix was also prepared in a similar manner. Their cycling responses in a half-cell configuration are shown in FIG. 9.

EXAMPLE 8

Preparation of Electro-Active Nano Particles (LiCoO$_2$-Based Cathode Material)

A micro-emulsion method was used to prepare nano-scaled lithium cobalt oxide particles. Stoichiometric LiNO$_3$ and Co(NO$_3$)$_2$ 6H$_2$O were dissolved in water to form an aqueous phase. The salinity of the aqueous phase was varied between 1 M and 2 M. The primary component of the oil phase was analytical grade cyclohexane. 1-Hexanol [CH$_3$(CH$_2$)$_6$OH] and OP-10 [polyoxyethylene octylphenyl ether, 4-(C$_8$H$_{17}$)C$_6$H$_4$(OCH$_2$CH$_2$)$_n$OH, n. 10] were chosen as the surfactant and co-surfactant, respectively. The volume ratio of the surfactant to the co-surfactant was adjusted to 3:2. The well-mixed water phase was added to the oil phase with the volume ratio maintained at 1:10. After thorough stirring, a thermodynamically stable micro-emulsion system was obtained. This micro-emulsion was added dropwise to the hot oil phase at 200° C. via a peristaltic pump. The obtained precursors were further dried at 400° C. to remove organic phase. The dried powders were calcined at 850° C. for 2 hours. The LiCoO$_2$ particle sizes were found to be between 85 and 150 nm.

The LiCoO$_2$ particles were mixed with a desired proportion of NGPs, phenolic resin, and acetone to make a suspension, which was then subjected to spray pyrolysis to obtain nanocomposite particles. The particles, containing phenolic resin, was then cured at 200° C. for one hour and carbonized at 600° C. for two hours to obtain the desired solid nanocomposite particles as a cathode active material. The final composition contains approximately 87% by weight lithium ion phosphate nano particles, 5% by weight NGPs, and 8% by weight carbon. A comparative sample containing approximately 87% by weight lithium ion phosphate nano particles and 13% carbon matrix was also prepared in a similar manner.

EXAMPLE 9

Preparation of Electro-Active Nano Particles (γ-LiV$_2$O$_5$-Based Cathode Material)

A simple and mild solvo-thermal method was used for the synthesis of γ-LiV$_2$O$_5$. In this process, elongated γ-LiV$_2$O$_5$ nano particles were synthesized directly from the solvo-thermal reaction of V$_2$O$_5$, LiOH and ethanol at 160° C. in an autoclave. Ethanol was employed as a solvent as well as a reducing agent. In a 50-ml Teflon vessel, 0.02 mol of analytically pure LiOH and V$_2$O$_5$ were mixed in 40 ml of ethanol. The mixture was subjected to magnetic stirring for 30 minutes. The Teflon vessel containing the mixture was then put into a stainless steel autoclave, which was maintained at 180° C. under autogenous pressure for 18 hours. The mixture was then allowed to cool to room temperature naturally. The as-formed solid precipitate was filtered, washed with ethanol and dried at 100° C. for 2 hours. Transmission electron microscopic examinations of the solid precipitate indicates that the γ-LiV$_2$O$_5$ particles have a length of 0.3-3 µm and a transverse dimension (diameter) of approximately 30-50 nm. These particles may be called "nano-rods." Presumably, the reaction can be expressed as follows: 2 LiOH+V$_2$O$_5$+CH$_3$CH$_2$OH→2 γ-LiV$_2$O$_5$+CH$_3$CHO+2H$_2$O.

Compared with the conventional preparation methods for γ-LiV$_2$O$_5$, this solvo-thermal method is less expensive and chemically milder. In particular, vacuum, argon/nitrogen protected atmosphere, or post-annealing is not necessary for this simple one-step process. This process offers a potentially low-temperature, low-cost, and environmentally friendly way of producing single-phase, uniform-particle size, and fine-grained γ-LiV$_2$O$_5$ for rechargeable lithium batteries.

Figure 10:
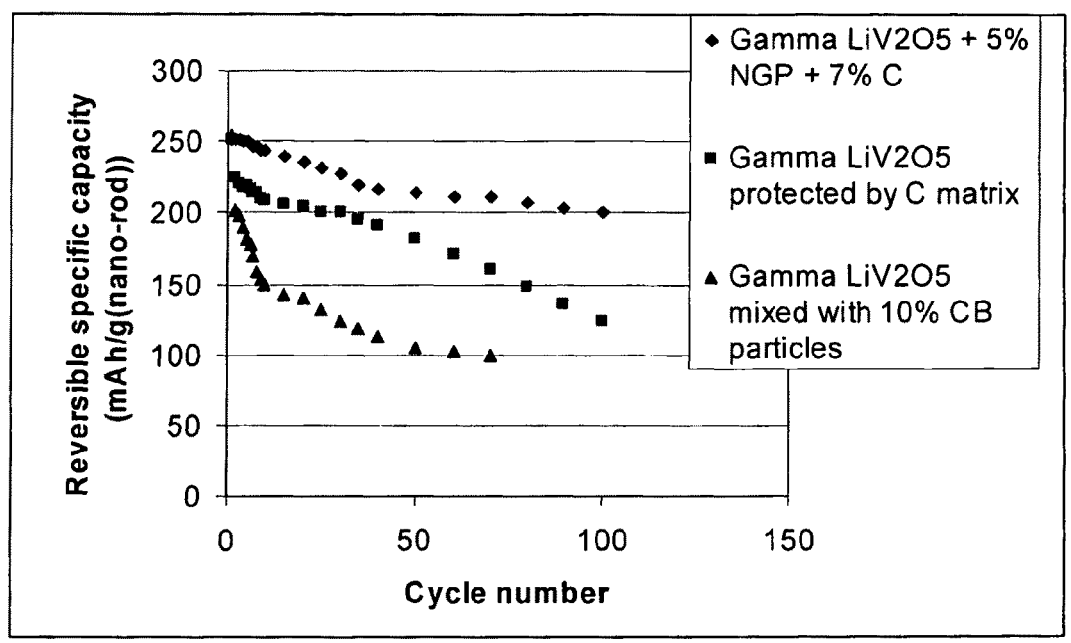
FIG. 10 Cycling responses of cathode strictures: (1) 88% by weight *-$LiV_2O_5$ nano-rods, 5% by weight NGPs, and 7% by weight carbon; (2) 88% by weight *-$LiV_2O_5$ nano-rods and 12% carbon matrix; and (3) bare *-$LiV_2O_5$ nano-rods only (prepared by mixing the nano-rods with carbon black (10%) as a conductive additive, bonded with 8% PVDF).

The γ-LiV$_2$O$_5$ nano-rods were mixed with a selected proportion of NGPs, phenolic resin, and acetone to make a suspension, which was then subjected to spray pyrolysis to obtain nanocomposite particles. The particles, containing phenolic resin, was then cured at 200° C. for one hour and carbonized at 600° C. for two hours to obtain the desired solid nanocomposite particles as a cathode active material. The final composition contains approximately 88% by weight γ-LiV$_2$O$_5$ nano-rods, 5% by weight NGPs, and 7% by weight carbon. A comparative sample containing approximately 88% by weight γ-LiV$_2$O$_5$ nano-rods and 12% carbon matrix was also prepared in a similar manner. For cycling test purpose, a third sample without any carbon protection (bare γ-LiV$_2$O$_5$ nano-rods only) was prepared by mixing the nano-rods with carbon black (10%) as a conductive additive, bonded with 8% PVDF as in the other two samples. The testing results, summarized in FIG. 10, indicate that a protective carbon matrix can effectively improve the cycling stability of γ-LiV$_2$O$_5$ nano-rod-based cathodes and that the presence of NGPs significantly enhances such a protection, perhaps by effectively reducing the amount of irreversibility and suppressing the crack formation.

EXAMPLE 10

Preparation of Electro-Active Nano Particles (LiMn$_2$O$_4$-Based Cathode Material)

A particularly useful process involves the insertion of lithium into electrolytic manganese dioxide (EMD) in an aqueous medium with glucose as a mild reductant in open air. The material resulting from calcination is pure, spinel-structured LiMn$_2$O$_4$ particles of sub-micrometric and nanometric size. In one example, the synthesis procedure entailed dissolving 75.4 g of lithium hydroxide (Aldrich) in 3 L of double-distilled water in a 10-L beaker. To this solution, 156.6 g of EMD was added and the resulting slurry was stirred for 1 hour at 80° C. Then 7.5 g of glucose dissolved in 500 mL of water was added while the slurry was being stirred, which was followed by the addition of 4 L of water. The stirring (reaction) was continued further for 8 hours at 80° C. At the end, the reaction slurry was 7.5 L and allowed to cool and settle for 12 hours. The solid product was washed several times with pure water and then dried at 120° C. The powder was calcined at 775° C. for 24 h in porcelain dishes. The particle sizes of the resulting LiMn$_2$O$_4$ were typically in the range of 40-120 nm. Two solid nanocomposite samples were prepared by using a procedure similar to that in Example 9. The compositions of these two samples are (90% LiMn$_2$O$_4$+1% NGP+9% carbon) and (90% LiMn$_2$O$_4$+8% NGP+2% carbon). The particles were found to be mostly spherical or ellipsoidal in shape.

EXAMPLE 11

The Cyclic Responses of Composites Composed of Si Nano Particles (60 nm) or Sub-Micron Particles (560 nm) Dispersed in an NGP-Reinforced Carbon Matrix or Graphite-Reinforced Carbon Matrix For comparison purposes, spherical nano-Si/graphite/carbon composite powders were prepared in the following manner: Nano-Si (99.9%, 60 nm) and natural graphite (~5 µm) powders were mixed in a weight ratio of 30:70. The Si and graphite powders were dispersed in a tetrahydrofuran (THF) solution in which a pitch (A500 from Ashland Chemical) as a carbon precursor was dissolved (solid Si-graphite content of 33 wt. %) and then vacuum-dried at 100° C. for 6 h. The dried composite was ball-milled for 6 hours to prepare the first spherical composite particles. Then, the first composite particles and petroleum-based pitch powders were mixed in a weight ratio of 87:13 again in a THF solution, followed by palletizing (using an atomizer-based spray-dryer in an air atmosphere) and heating under an argon atmosphere at 1,000° C.

Two Si-NGP-carbon composites were prepared as follows: Si particles (60 nm and 560 nm in diameter, separately) and NGPs (average thickness=8.9 nm) were dispersed in a THF solution in which a pitch as a carbon precursor was dissolved. The resulting suspension was palletized (using an atomizer-based spray-dryer in an air atmosphere) and heated under an argon atmosphere at 1,000° C. to obtain solid composite particles of substantially spherical shape (containing Si nano particles) and ellipsoidal shape (Sub-micron Si particles with an average diameter of 560 nm).

Figure 11:
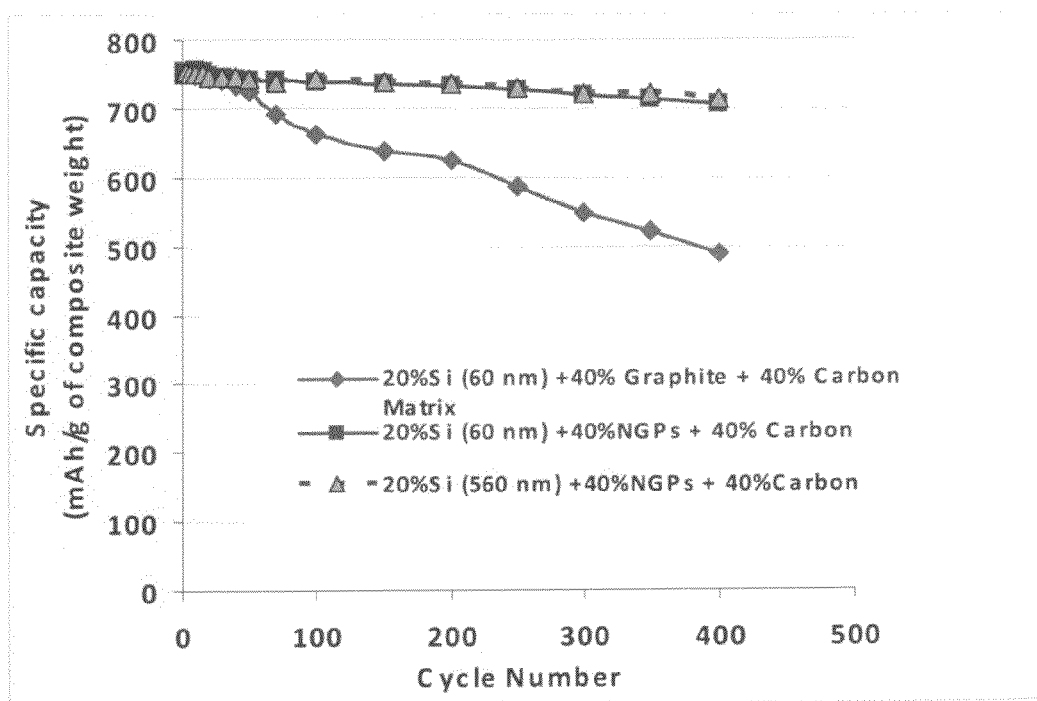
FIG. 11 Cycling responses of three composite materials: (1) Approximately 20% Si (60 nm diameter)+40% graphite+40% carbon; (2) Approximately 20% Si (60 nm diameter)+40% NGPs+40% carbon; and (3) Approximately 20% Si (560 nm diameter)+40% NGPs+40% carbon.

The electrochemical behaviors of these three composite materials were evaluated and the results in terms of the reversible specific capacity as a function of cycles are plotted in FIG. 11. Two highly significant observations can be made here. The first is the notion that the NGP-reinforced carbon matrix is more effective than the graphite-reinforced carbon matrix in terms of serving as a protecting matrix for Si particles to maintain long-term structural integrity of an electrode. Although the graphite-reinforced sample performed well during the first 50 cycles, its response deteriorated significantly after 70 cycles. In contrast, both NGP-protected samples maintain a specific capacity higher than 700 mAh/g even after 400 cycles. It is of significance to note that ball-milling of graphite particles could destruct the particle structure and perhaps sporadically form some graphite flaks (e.g., >50-100 nm) or even some small amount of nano graphene platelets (e.g., <50 nm). But, FIG. 11 clearly showed that this configuration was not good enough to provide long-term protection against electrode deterioration induced by repeated charge and discharge operations.

The second observation is that sub-micron Si particles (560 nm) performed as well as the nano-scaled Si particles (60 nm) when under the protection of an NGP-reinforced carbon matrix. This is significant since nano-scale particles are typically quite expensive to produce, yet sub-micron particles can be cost-effectively made by techniques such as high-intensity ball-milling.

EXAMPLE 12

Fracture Toughness of Carbon, Graphite-Reinforced Carbon, and NGP-Reinforced Carbon Matrix Materials In order to gain additional insight into the reasons why isolated or discrete NGPs prepared prior to being incorporated in a carbon matrix performed so well in helping to maintain the long-term electrode integrity, we decided to measure the fracture toughness or critical stress intensity factor of three series of composite samples using ASTM E399 fracture toughness test. One series of composites contain isolated NGPs (<10 nm, supplied from Angstron Materials, LLC, Dayton, Ohio) as a nano filler or reinforcement. The second series of composites contain fine graphite particles (approximately 5 μm) dispersed in a carbon matrix. The third series of composites were prepared from a petroleum pitch containing some meso-phase domains. Several meso-phase pitch samples were separately subjected to graphitization treatments (2,000° C. for 1-5 hours and 2,500° C. for 1-2 hours) to grow graphite crystallites of different weight fractions in situ from the pitch matrix. Some of these graphite crystallites may be qualified as nano graphene platelets since they might have a thickness <50 μm). But, these graphene structures are part of a carbon structure and grew out of the carbon matrix.

Figure 12:
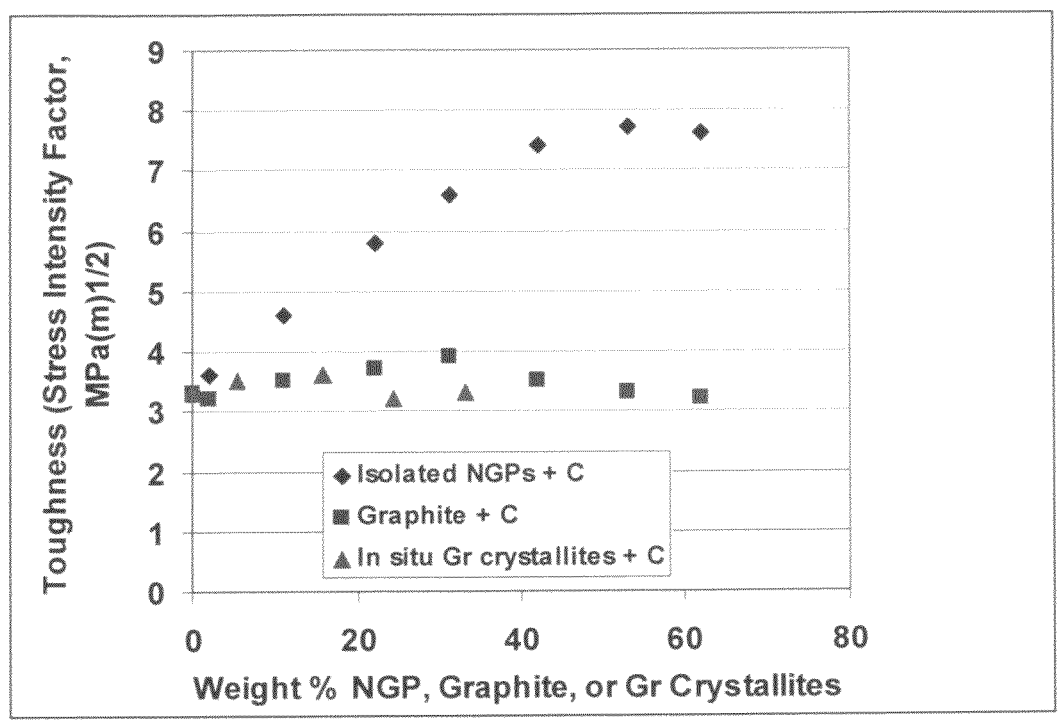
FIG. 12 Fracture toughness (critical stress intensity factor) values of three series of carbon matrix composites: (1) carbon matrix reinforced with NGPs; (2) carbon matrix reinforced with graphite particles; and (3) carbon matrix reinforced with graphite crystallites in-situ grown from a carbon matrix at high temperatures for extended periods of time.

The fracture toughness data, an indication of resistance to micro-crack nucleation and growth, are shown in FIG. 12. Although graphite particles were slightly effective in improving the cracking resistance of carbon, this improvement was diminished when the graphite weight fraction exceeded 30%. This might be due to the difficulty in uniformly dispersing graphite particles. Furthermore, natural graphite particles are not a high-strength material. Similarly, graphite crystallites grown in situ from a carbon matrix source were not effective in improving the cracking resistance of carbon as well. Such a graphitization treatment inevitably involves an ultra-high temperature (typically >2,000° C.) that is slow and energy-intensive. Such a high temperature environment is also conducive to the occurrence of undesirable chemical reactions (e.g., reaction of Si with C to form SiC, reducing the useful amount of Si).

Quite surprisingly, the isolated NGPs prepared before being added into a carbon matrix provide very impressive enhancement in cracking resistance for carbon up to 60% by weight of NGPs. This observation appears to further assert the notion that isolated NGPs are a totally different class of material than carbon and graphite.

In conclusion, we have successfully developed a new and novel class of solid nanocomposite particles that are superior lithium battery electrode materials. These particles contain an electro-active material that has a high lithium storage capacity and a protective matrix material that is reinforced by NGPs. Such a nanocomposite platform technology has the following highly desirable features or advantages:

(1) NGPs are of high strength, high electrical conductivity, and high thermal conductivity. As a matter of fact, NGPs have been recently found to exhibit the highest intrinsic strength and highest intrinsic thermal conductivity among all existing materials [41,42]. NGPs are a new class of material.

(2) A high thermal conductivity implies a high heat dissipation rate. This is an important feature since the charge and discharge operations of a battery produce a great amount of heat. Without a fast heat dissipation rate, the battery cannot be charged or discharged at a high rate.

(3) The high strength of NGPs significantly improves the overall strength and fracture toughness (resistance to cracking) of a protective matrix (such as carbon) which is otherwise usually weak or brittle.

(4) The most commonly used protective matrix is carbon which is not very electrically conductive. NGPs have an electrical conductivity (up to 20,000 S/cm) that is several orders of magnitude higher than that of carbon matrix (typically 0.001-1 S/cm).

(5) Carbon matrix intrinsically has an excessive amount of defect sites that irreversibly trap or capture lithium atoms or ions (would not let go during discharge), thereby significantly reducing the amount of lithium that can shuttle back and forth between the anode and cathode. By adding a certain amount of NGPs, which are themselves an anode active material, one can effectively reduce the proportion of carbon (hence, reducing the amount of irreversibility).

(6) Although conventional graphite particles (being also an anode active material) can be added to the carbon matrix to reduce the amount of the protective carbon, our experimental data have demonstrated that these graphite particles do not improve the cracking resistance of carbon. Therefore, the resulting anode composite materials (e.g., containing Si and graphite particles dispersed in a carbon matrix) do not provide a long cycle life. By contrast, by replacing graphite particles with NGPs that are of much higher strength, we were able to significantly increase the useful cycle life while maintaining the reversible capacity at an unprecedented level.

(7) Carbon nano-tubes (CNTs) were found to be an effective nano reinforcement additive for a protective matrix material as well. But, CNTs remain too expensive at this stage of development. The NGP-reinforced solid nanocomposite particles of the present invention can be readily mass-produced and are of low cost.

(8) Quite surprisingly, NGP-containing solid nanocomposite can be readily made into spherical particles having a small diameter (typically lower than 10 μm, more often lower than 5 μm, and can be smaller than 1 μm). This is particularly desirable for power tool and electric vehicle applications where the battery must be capable of being charged and discharged at a high rate.

(9) Further surprisingly, NGP-reinforced protective matrix materials appear to be capable of effectively cushioning the large volume changes of electro-active materials such as Si. When these electro-active materials have a dimension smaller than 1 μm, they can maintain good structural integrity, under the protection of a NGP-reinforced matrix, during repeated charge-discharge cycles. Besides, the matrix itself also becomes quite resistant to crack initiation and propagation.

(10) The present approach is applicable to both the cathode and anode and, hence, is good for both lithium metal batteries (for their cathodes) and lithium ion batteries (for anodes and cathodes).

(11) As pointed out earlier, the anode structure of Chan, et al [Ref. 28] is not compatible with the existing practice of making lithium ion battery that involves coating and laminating anode, separator, and cathode layers through several stages of rolling operations. The vertically grown Si nano-wires would not survive such a procedure. In contrast, our anode material requires no variation in the existing procedures and requires no additional capital equipment.

In summary, the presently invented solid nanocomposite particles surprisingly impart the following highly desirable attributes to a lithium battery electrode: high reversible capacity, low irreversible capacity, small particle sizes (for high-rate capacity), compatibility with commonly used electrolytes, and long charge-discharge cycle life.

The invention claimed is:

1. A process for producing solid nanocomposite particles for lithium metal or lithium ion battery electrodes, said process comprising:
(A) preparing an electrode active material in a form of fine particles, rods, wires, fibers, or tubes with a dimension smaller than 1 μm;
(B) preparing separated or isolated nano graphene platelets with a thickness less than 50 nm; and
(C) dispersing said nano graphene platelets and said electrode active material in a protective matrix material to form said solid nanocomposite particles, wherein said protective matrix material is reinforced by said nano graphene platelets.

2. The process of claim 1, wherein Step (C) comprises:
(i) dispersing said nano graphene platelets and said electrode active material in a precursor fluid medium to form a suspension wherein said fluid medium contains a precursor matrix material dispersed or dissolved therein; and
(ii) converting suspension to said solid nanocomposite particles, wherein said precursor matrix material is converted into said protective matrix material reinforced by said nano graphene platelets and said electrode active material is substantially dispersed in said protective matrix material.

3. The process of claim 2, wherein said step of converting comprises atomizing or aerosolizing said suspension into solid nanocomposite particles.

4. The process of claim 2, wherein said solid nanocomposite particles have a substantially spherical or ellipsoidal shape.

5. The process of claim 1, wherein said solid nanocomposite particles are of substantially spherical or ellipsoidal shape with a dimension less than 10 μm.

6. The process of claim 2, wherein said solid nanocomposite particles are of substantially spherical or ellipsoidal shape with a dimension less than 5 μm.

7. The process of claim 1, wherein said protective matrix material is lithium ion-conducting.

8. The process of claim 1, wherein said protective matrix material is selected from a polymer, polymeric carbon, amorphous carbon, meso-phase carbon, coke, petroleum pitch, coal tar pitch, meso-phase pitch, metal oxide, metal hydride, metal nitride, metal carbide, metal sulfide, ceramic, inorganic, organic material, or a combination thereof.

9. The process of claim 2, wherein said step of converting said suspension comprises a step selected from (a) solidifying a precursor polymer or resin liquid into a solid polymer or resin; (b) removing a liquid or solvent from said suspension; (c) polymerizing a precursor monomer material; (d) curing a precursor resin to form a solid resin; (e) inducing a chemical reaction to form the protective matrix material; (f) heat-treating an organic material to form a carbon matrix material; or a combination thereof.

10. The process of claim 9, wherein said step of heat-treating the organic material comprises pyrolyzing or heat-treating a polymer, resin, coal tar pitch, petroleum pitch, meso-phase pitch, coke, sugar, glucose, or a combination thereof to produce a carbon matrix material.

11. The process of claim 1, wherein said nano graphene platelets have a thickness less than 10 nm.

12. The process of claim 1, wherein said nano graphene platelets have a thickness less than 1 nm.

13. The process of claim 1, wherein said graphene platelets are prepared from exfoliation and platelet separation of a natural graphite, synthetic graphite, highly oriented pyrolytic graphite, graphite fiber, carbon fiber, carbon nano-fiber, graphitic nano-fiber, spherical graphite or graphite globule, meso-phase micro-bead, meso-phase pitch, graphitic coke, or graphitized polymeric carbon; and said step of exfoliation and platelet separation is conducted independent of or separate from said step (A) of preparing the active material.

14. The process as defined in claim 1, wherein said electrode active material comprises fine particles, rods, wires, fibers, or tubes with a dimension smaller than 0.5 μm.

15. The process as defined in claim 1, wherein said electrode active material comprises fine particles, rods, wires, fibers, or tubes with a dimension smaller than 200 nm.

16. The process as defined in claim 1, wherein said electrode active material comprises nano particles, nano rods, nano wires, nano fibers, or nano tubes with a dimension smaller than 700 nm but larger than 100 nm.

17. The process as defined in claim 1, wherein said electrode active material comprises nano particles, nano rods, nano wires, nano fibers, or nano tubes of silicon, germanium, or tin with a diameter smaller than 100 nm.

18. The process of claim 1 wherein the electrode active material comprises an anode active material selected from the group consisting of:
   a) silicon (Si), germanium (Ge), tin (Sn), lead (Pb), antimony (Sb), bismuth (Bi), zinc (Zn), aluminum (Al), and cadmium (Cd);
   b) alloys or intermetallic compounds of Si, Ge, Sn, Pb, Sb, Bi, Zn, Al, or Cd with other elements, wherein said alloys or compounds are stoichiometric or non-stoichiometric;
   c) oxides, carbides, nitrides, sulfides, phosphides, selenides, and tellurides of Si, Ge, Sn, Pb, Sb, Bi, Zn, Al, Fe, or Cd, and their mixtures or composites; and
   d) combinations thereof.

19. The process of claim 1 wherein the electrode active material comprises a cathode active material selected from the group consisting of lithium cobalt oxide, doped lithium cobalt oxide, lithium nickel oxide, doped lithium nickel oxide, lithium manganese oxide, doped lithium manganese oxide, lithium iron phosphate, lithium manganese phosphate, lithium vanadium oxide, doped lithium vanadium oxide, lithium vanadium phosphate, lithium transition metal phosphate, lithium mixed-metal phosphates, metal sulfides, metal phosphides, metal halogenides, and combinations thereof.

20. The process of claim 1 wherein said graphene platelets occupy a weight fraction $w_g$ of 2% to 50% of the total nanocomposite weight, said electrode active material occupies a weight fraction $w_a$ of 10% to 80% of the total nanocomposite weight, and said matrix material occupies a weight fraction $w_m$ of 4% to 30% of the total nanocomposite weight with $w_g + w_a + w_m = 1$.

21. The process of claim 1, further comprising a nano filler selected from a carbon nano-tube, a carbon nano-fiber, or a nano-rod.

* * * * *